US011511861B2

(12) United States Patent
Young et al.

(10) Patent No.: US 11,511,861 B2
(45) Date of Patent: Nov. 29, 2022

(54) OVERHEAD PAYLOAD MODULE WITH INTEGRATED STOWBINS

(71) Applicant: The Boeing Company, Chicago, IL (US)

(72) Inventors: Stephen M. Young, Alamitos, CA (US); Duane M. Egging, Everett, WA (US); Douglas J. Seiersen, Lake Stevens, WA (US); Kyong S. Kim, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 306 days.

(21) Appl. No.: 17/023,669

(22) Filed: Sep. 17, 2020

(65) Prior Publication Data

US 2021/0001985 A1    Jan. 7, 2021

Related U.S. Application Data

(63) Continuation of application No. 16/134,702, filed on Sep. 18, 2018, now Pat. No. 10,807,716.

(51) Int. Cl.
*B64D 11/00* (2006.01)
*B64F 5/10* (2017.01)

(52) U.S. Cl.
CPC .............. *B64D 11/003* (2013.01); *B64F 5/10* (2017.01)

(58) Field of Classification Search
CPC ........... B64D 11/003; B64F 5/10; Y02T 50/40
See application file for complete search history.

(56) References Cited

U.S. PATENT DOCUMENTS

| 6,073,883 A | 6/2000 | Ohlmann et al. |
| 8,342,449 B2 * | 1/2013 | Schuld .................. B64D 11/00 244/119 |

(Continued)

FOREIGN PATENT DOCUMENTS

| DE | 102007009280 | 8/2008 |
| DE | 102008016418 | 10/2009 |
| EP | 0901964 | 3/1999 |

OTHER PUBLICATIONS

Extended European Search Report prepared by the European Patent Office in application No. EP 19 19 8088.7 dated Feb. 26, 2020.

*Primary Examiner* — Valentina Xavier
(74) *Attorney, Agent, or Firm* — McDonnell Boehnen Hulbert & Berghoff LLP

(57) ABSTRACT

In an example, an overhead payload module is described. The overhead payload module comprises a ceiling assembly, an aisle floor assembly, a first payload assembly attached to the ceiling assembly and the aisle floor assembly to form a first side of the overhead payload module, and a second payload assembly attached to the ceiling assembly and the aisle floor assembly to form a second side of the overhead payload module. The first payload assembly comprises a first payload module and a first overhead stowbin module structurally integrated with the first payload module and having a first stowage area configured to receive stowbins. The second payload assembly is positioned opposite the first payload assembly to form an aisle therebetween and comprises a second payload module and a second overhead stowbin module structurally integrated with the second payload module and having a second stowage area configured to receive stowbins.

20 Claims, 25 Drawing Sheets

(56) References Cited

U.S. PATENT DOCUMENTS

| | | |
|---|---|---|
| 2010/0019087 A1 | 1/2010 | Warner et al. |
| 2014/0054417 A1 | 2/2014 | Spellman et al. |
| 2016/0297528 A1 | 10/2016 | Sankrithi et al. |
| 2017/0355463 A1 | 12/2017 | Simms |

* cited by examiner

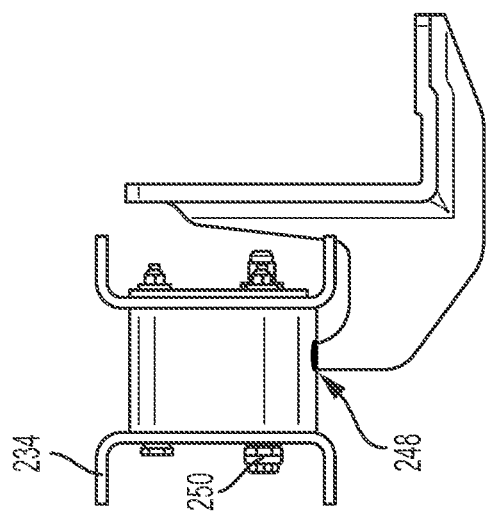
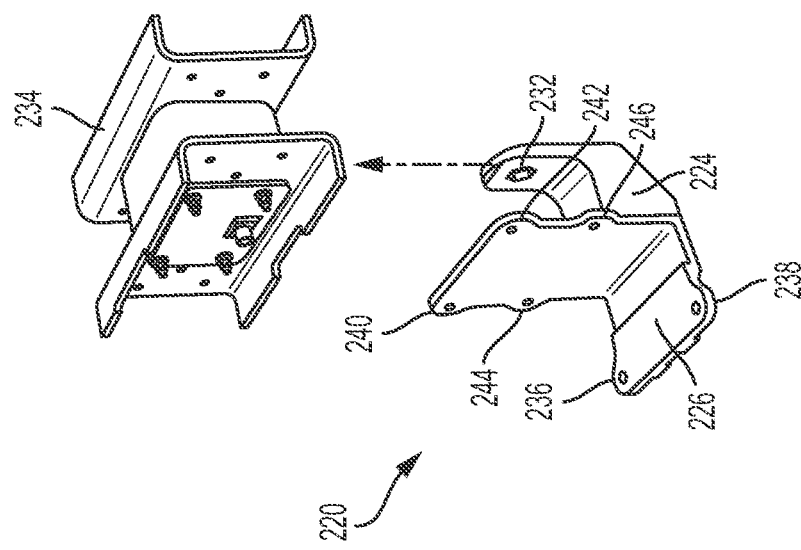
FIG. 17

OVERHEAD PAYLOAD MODULE WITH INTEGRATED STOWBINS

CROSS REFERENCE TO RELATED APPLICATION

The present disclosure is a continuation of U.S. patent application Ser. No. 16/134,702, filed on Sep. 18, 2018, the entire contents of which are herein incorporated by reference.

FIELD

The present disclosure relates generally to an overhead payload module in an aircraft, and more particularly, to a module that can be structurally integrated with stowbins and installed in the aircraft.

BACKGROUND

Certain types of aircrafts, such as those used for flights that occur overnight and/or flights that are longer in duration, often include modules for accommodation of crew members. Some such modules can be positioned above or below the main cabin area of the aircraft and can include an aisleway or other means of movement through the module.

In existing aircrafts where such a module is positioned above the main cabin area, the module is typically positioned above the main cabin stowbins that are used by passengers. In particular, the module is typically mounted within the aircraft to a support structure. A stowbin support assembly in which the stowbins can be inserted is also separately mounted to the support structure underneath the module such that the module is independent of the stowbin support assembly. This stowbin support assembly also typically serves as an integration platform for various systems within the aircraft, such as air systems, lighting, etc.

Modules and stowbin support assemblies in existing arrangements often have space that is unutilized or underutilized. As another example, existing arrangements are heavier than desired, and both costly to manufacture and install. For instance, because the module and the stowbin support assembly are typically mounted within the aircraft to the same support structure, the support structure typically requires space for both commodities. In addition, having to separately mount and secure the module and the stowbin support assembly to the same support structure can increase the amount of time spent during installation and can require excessive components such as fasteners.

SUMMARY

In an example, an overhead payload module for installation in an aircraft is described. The overhead payload module comprises a ceiling assembly, an aisle floor assembly, a first payload assembly, a second payload assembly, and a plurality of aisle support structures. The first payload assembly is attached to the ceiling assembly and the aisle floor assembly to form a first side of the overhead payload module and comprises a first payload module comprising a first floor panel, and a first overhead stowbin module structurally integrated with the first payload module and having a first stowage area configured to receive stowbins and accessible via a main cabin area of the aircraft. The first overhead stowbin module comprises a first pair of end walls attached to a first stowbin side wall, and the first pair of end walls, the first stowbin side wall, and the first floor panel define the first stowage area. The second payload assembly is attached to the ceiling assembly and the aisle floor assembly to form a second side of the overhead payload module. The second payload assembly is positioned opposite the first payload assembly to form an aisle therebetween and comprises a second payload module comprising a second floor panel, and a second overhead stowbin module structurally integrated with the second payload module and having a second stowage area configured to receive stowbins and accessible via the main cabin area of the aircraft. The second overhead stowbin module comprises a second pair of end walls attached to a second stowbin side wall, and the second pair of end walls, the second stowbin side wall, and the second floor panel define the second stowage area. The plurality of aisle support structures is attached to the overhead payload module at a plurality of different locations along a length of the aisle floor assembly. Each aisle support structure of the plurality of aisle support structures comprises a first support bracket having a first arm attached to the first payload assembly and a second arm attached to the aisle floor assembly, a second support bracket positioned opposite the first support bracket and having a first arm attached to the second payload assembly and a second arm attached to the aisle floor assembly, and a cross member having a first end portion attached between the aisle floor assembly and the first support bracket and having a second end portion attached between the aisle floor assembly and the second support bracket.

In another example, an aircraft is described comprising a fuselage, an overhead payload module, and a support rail assembly positioned within the fuselage and configured to support the overhead payload module. The overhead payload module comprises a ceiling assembly, an aisle floor assembly positioned above the main cabin area of the aircraft, a first payload assembly, a second payload assembly, and a plurality of aisle support structures. The first payload assembly is attached to the ceiling assembly and the aisle floor assembly to form a first side of the overhead payload module and comprises a first payload module comprising a first floor panel, and a first overhead stowbin module structurally integrated with the first payload module and having a first stowage area configured to receive stowbins and accessible via the main cabin area of the aircraft. The first overhead stowbin module comprises a first pair of end walls attached to a first stowbin side wall, and the first pair of end walls, the first stowbin side wall, and the first floor panel define the first stowage area. The second payload assembly is attached to the ceiling assembly and the aisle floor assembly to form a second side of the overhead payload module. The second payload assembly is positioned opposite the first payload assembly to form an aisle therebetween and comprises a second payload module comprising a second floor panel, and a second overhead stowbin module structurally integrated with the second payload module and having a second stowage area configured to receive stowbins and accessible via the main cabin area of the aircraft. The second overhead stowbin module comprises a second pair of end walls attached to a second stowbin side wall, and the second pair of end walls, the second stowbin side wall, and the second floor panel define the second stowage area. The plurality of aisle support structures is attached to the overhead payload module at a plurality of different locations along a length of the aisle floor assembly. Each aisle support structure of the plurality of aisle support structures comprises a first support bracket having a first arm attached to the first payload assembly and a second arm attached to the aisle floor assembly, a second support bracket positioned opposite the first support bracket and having a first arm attached to the second payload assembly and a second arm attached to the aisle floor assembly, and a cross member having a first end portion attached between the aisle floor assembly and the first support bracket and having a second end portion attached between the aisle floor assembly and the second support bracket.

In another example, a method for balancing load in, and reinforcing an aisle structure of, an overhead payload module of an aircraft is described. The method comprises attaching a first payload assembly to (i) a ceiling assembly and (ii) an aisle floor assembly to form a first side of the overhead payload module. The first payload assembly comprises a first payload module comprising a first floor panel, and a first overhead stowbin module structurally integrated with the first payload module and having a first stowage area configured to receive stowbins and accessible via a main cabin area of the aircraft. The first overhead stowbin module comprises a first pair of end walls attached to a first stowbin side wall, and the first pair of end walls, the first stowbin side wall, and the first floor panel define the first stowage area. The method further comprises attaching a second payload assembly to (i) the ceiling assembly and (ii) the aisle floor assembly to form a second side of the overhead payload module, wherein the second payload assembly is positioned opposite the first payload assembly to form an aisle therebetween. The second payload assembly comprises a second payload module comprising a second floor panel, and a second overhead stowbin module structurally integrated with the second payload module and having a second stowage area configured to receive stowbins and accessible via the main cabin area of the aircraft. The second overhead stowbin module comprises a second pair of end walls attached to a second stowbin side wall, and the second pair of end walls, the second stowbin side wall, and the second floor panel define the second stowage area. The method further comprises attaching a plurality of aisle support structures to the overhead payload module at a plurality of different locations along a length of the aisle floor assembly, where attaching the plurality of aisle support structures to the overhead payload module comprises, for each aisle support structure of the plurality of aisle support structures: attaching a first arm of a first support bracket to the first payload assembly and a second arm of the first support bracket to the aisle floor assembly, attaching a first arm of a second support bracket, positioned opposite the first support bracket, to the second payload assembly and a second arm of the second support bracket to the aisle floor assembly, and attaching a first end portion of a cross member between the aisle floor assembly and the first support bracket and a second end portion of the cross member between the aisle floor assembly and the second support bracket.

In another example, an overhead payload module for installation in an aircraft is described. The overhead payload module comprises a ceiling assembly, an aisle floor assembly, a first payload assembly, and a second payload assembly. The first payload assembly is attached to the ceiling assembly and the aisle floor assembly to form a first side of the overhead payload module. The first payload assembly comprises a first payload module comprising a first floor panel and a first back wall, a first plurality of blade fittings attached along a length of an exterior of the first payload module to the first back wall and the first floor panel, and a first overhead stowbin module structurally integrated with the first payload module and having a first stowage area configured to receive stowbins and accessible via a main cabin area of the aircraft. The second payload assembly is attached to the ceiling assembly and the aisle floor assembly to form a second side of the overhead payload module and is positioned opposite the first payload assembly to form an aisle therebetween. The second payload assembly comprises a second payload module comprising a second floor panel and a second back wall, a second plurality of blade fittings attached along a length of an exterior of the second payload module to the second back wall and the second floor panel, and a second overhead stowbin module structurally integrated with the second payload module and having a second stowage area configured to receive stowbins and accessible via the main cabin area of the aircraft. Each blade fitting of the first plurality of blade fittings and the second plurality of blade fittings is configured for attaching to a support rail assembly of the aircraft so as to attach the overhead payload module to the support rail assembly within the aircraft.

In another example, an aircraft is described comprising a fuselage, an overhead payload module, and a support rail assembly a support rail assembly positioned within the fuselage and configured to support the overhead payload module. The overhead payload module comprises a ceiling assembly, an aisle floor assembly positioned above a main cabin area of the aircraft, a first payload assembly, and a second payload assembly. The first payload assembly is attached to the ceiling assembly and the aisle floor assembly to form a first side of the overhead payload module. The first payload assembly comprises a first payload module comprising a first floor panel and a first back wall, a first plurality of blade fittings attached along a length of an exterior of the first payload module to the first back wall and the first floor panel, and a first overhead stowbin module structurally integrated with the first payload module and having a first stowage area configured to receive stowbins and accessible via the main cabin area of the aircraft. The second payload assembly is attached to the ceiling assembly and the aisle floor assembly to form a second side of the overhead payload module and is positioned opposite the first payload assembly to form an aisle therebetween. The second payload assembly comprises a second payload module comprising a second floor panel and a second back wall, a second plurality of blade fittings attached along a length of an exterior of the second payload module to the second back wall and the second floor panel, and a second overhead stowbin module structurally integrated with the second payload module and having a second stowage area configured to receive stowbins and accessible via the main cabin area of the aircraft. Each blade fitting of the first plurality of blade fittings and the second plurality of blade fittings is configured for attaching to a support rail assembly of the aircraft so as to attach the overhead payload module to the support rail assembly within the aircraft. Each blade fitting of the first plurality of blade fittings and the second plurality of blade fittings is configured for attaching to the support rail assembly so as to attach the overhead payload module to the support rail assembly within the aircraft.

In another example, a method for or assembling an overhead payload module of an aircraft is described. The method comprises attaching a first payload assembly to (i) a ceiling assembly and (ii) an aisle floor assembly to form a first side of the overhead payload module. The first payload assembly comprises a first payload module comprising a first floor panel and a first back wall, and a first overhead stowbin module structurally integrated with the first payload module and having a first stowage area configured to receive stowbins and accessible via a main cabin area of the aircraft. The method further comprises attaching a second payload assembly to (i) the ceiling assembly and (ii) the aisle floor assembly to form a second side of the overhead payload module, where the second payload assembly is positioned opposite the first payload assembly to form an aisle therebetween. The second payload assembly comprises a second payload module comprising a second floor panel and a second back wall, and a second overhead stowbin module structurally integrated with the second payload module and having a second stowage area configured to receive stowbins and accessible via the main cabin area of the aircraft. The method further comprises attaching a first plurality of blade fittings along a length of an exterior of the first payload module to the first back wall and the first floor panel and attaching a second plurality of blade fittings along a length of an exterior of the second payload module to the second back wall and the second floor panel. Each blade fitting of the first plurality of blade fittings and the second plurality of blade fittings is configured for attaching to a support rail assembly of the aircraft so as to attach the overhead payload module to the support rail assembly within the aircraft.

In another example, a method for installing an overhead payload module in an aircraft is described. The method comprises providing a support rail assembly in the aircraft, where the support rail assembly comprises a first support rail positioned on a first side of the aircraft and a second support rail positioned on a second side of the aircraft opposite the first side, where the first support rail and the second support rail are substantially parallel and substantially planar. The method further comprises attaching the overhead payload module to the support rail assembly to position the overhead payload module above a main cabin area of the aircraft and between the first support rail and the second support rail. The overhead payload module comprises a first payload assembly and a second payload assembly. The first payload assembly comprises a first payload module, a first overhead stowbin module structurally integrated with the first payload module and having a first stowage area, and a first plurality of blade fittings attached along a length of an exterior of the first payload module. Each blade fitting of the first plurality of blade fittings comprises a bracket portion attached to a first back wall and a first floor panel of the first payload module and a hook portion protruding from the bracket portion and attachable to the first support rail. The second payload assembly comprises a second payload module, a second overhead stowbin module structurally integrated with the second payload module and having a second stowage area, and a second plurality of blade fittings attached along a length of an exterior of the second payload module. Each blade fitting of the second plurality of blade fittings comprises a bracket portion attached to a second back wall and a second floor panel of the second payload module and a hook portion protruding from the bracket portion and attachable to the second support rail. Attaching the overhead payload module to the support rail assembly to position the overhead payload module above the main cabin area of the aircraft and between the first support rail and the second support rail comprises attaching the hook portion of each blade fitting of the first plurality of blade fittings to the first support rail and attaching the hook portion of each blade fitting of the second plurality of blade fittings to the second support rail.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 17 illustrates a perspective view of the blade fitting and a support rail, as well as another side view of the blade fitting, according to an example implementation.

DETAILED DESCRIPTION

Figure 1:
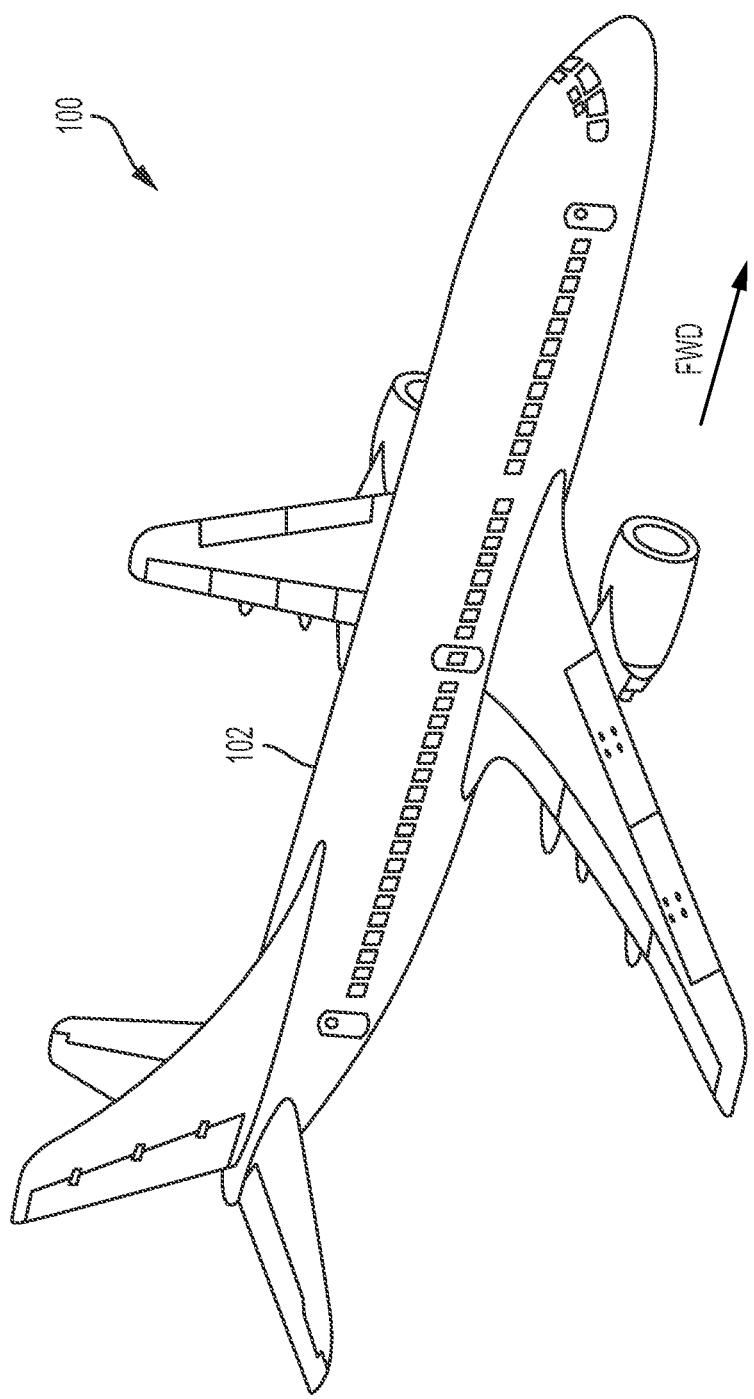
FIG. 1 is a perspective view of an aircraft, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples, an overhead payload module is described. More specifically, example systems describe the overhead payload module within an aircraft, and example methods describe assembling the overhead payload module, installing the overhead payload module in the aircraft, and configuring the overhead payload module to balance load and reinforce an aisle structure of the overhead payload module.

The term "overhead payload module," as used herein, describes a structure that integrates a payload structure (which defines a payload area) with an overhead stowbin module. By way of example, such a payload structure and corresponding area can take the form of a crew rest or passenger rest area that includes bunks, tables, and/or other commodities. As another example, such a payload structure and corresponding area could take the form of a stowage area for luggage and/or other objects, or perhaps another area in which crew and/or passengers could be seated, as an alternative to the main cabin seating. Other payload examples are possible as well.

The methods and systems described herein may involve an overhead payload module having two sides, each having a respective payload module that structurally integrates a stowbin module. This structural integration can cause the overhead payload module to be more ergonomic, less costly, less heavy, and easier to assemble and install than existing arrangements. Other advantages are described herein as well.

What is needed is an overhead module that is stronger and more ergonomic and structurally efficient, which can in turn reduce cost and time spent during manufacture and installation, and can provide improved load carrying capabilities.

To structurally reinforce the overhead payload module and enable the overhead payload module to carry loads in a desirable manner, the overhead payload module includes various aisle support structures that attach to an aisle floor assembly of the overhead payload module, as well as to various other components of the overhead payload module. These aisle support structures help create, in effect, a load path from one side of the overhead payload module to the other, and can help increase the load-carrying capabilities of the overhead payload module. Further, these aisle support structures, as well as other components described herein, can improve the strength and stability of the aisle of the overhead payload module. For example, the stowbin modules include various walls that define a stowage area into which stowbins can be inserted. Some of these walls can serve as vertical support means that are attached to, contacting, or otherwise structurally reinforcing the aisle. The overhead payload module can be configured in other ways as well to structurally reinforce the overhead payload module and enable the overhead payload module to carry loads in a desirable manner.

Additionally or alternatively, to secure the overhead payload module to support rails when the overhead payload module is installed in the aircraft, the overhead payload module includes various "blade fittings" that are configured in such a way that enables the overhead payload module to be more easily secured to the support rails during installation. In addition, these blade fittings can help stabilize the overhead payload module within the aircraft and increase the ability of the overhead payload module to handle loads. For example, the blade fittings can be arranged and configured such that one or more blade fittings include spherical bearings for attaching the blade fitting(s) to the support rails and one or more other blade fittings include a non-spherical bearing for attaching the other blade fitting(s) to the support rails. Because the spherical bearings have more freedom of movement than non-spherical bearings, the blade fittings having spherical bearings can compensate for excessive loads and any potential misalignment. As such, the blade fittings having spherical bearings and the blade fittings having non-spherical bearings can be arranged in a manner that designates a desirable load path through areas of the overhead payload module that can handle such loads more easily than other areas, thereby improving load distribution.

These and other improvements are described in more detail below. Implementations described below are for purposes of example. The implementations described below, as well as other implementations, may provide other improvements as well.

Referring now to the figures, FIG. 1 is a perspective view of an aircraft 100, according to an example implementation. Aircraft 100 includes a fuselage 102 that can include a main cabin area, an overhead payload module, and other components and areas of the aircraft 100.

Figure 2:
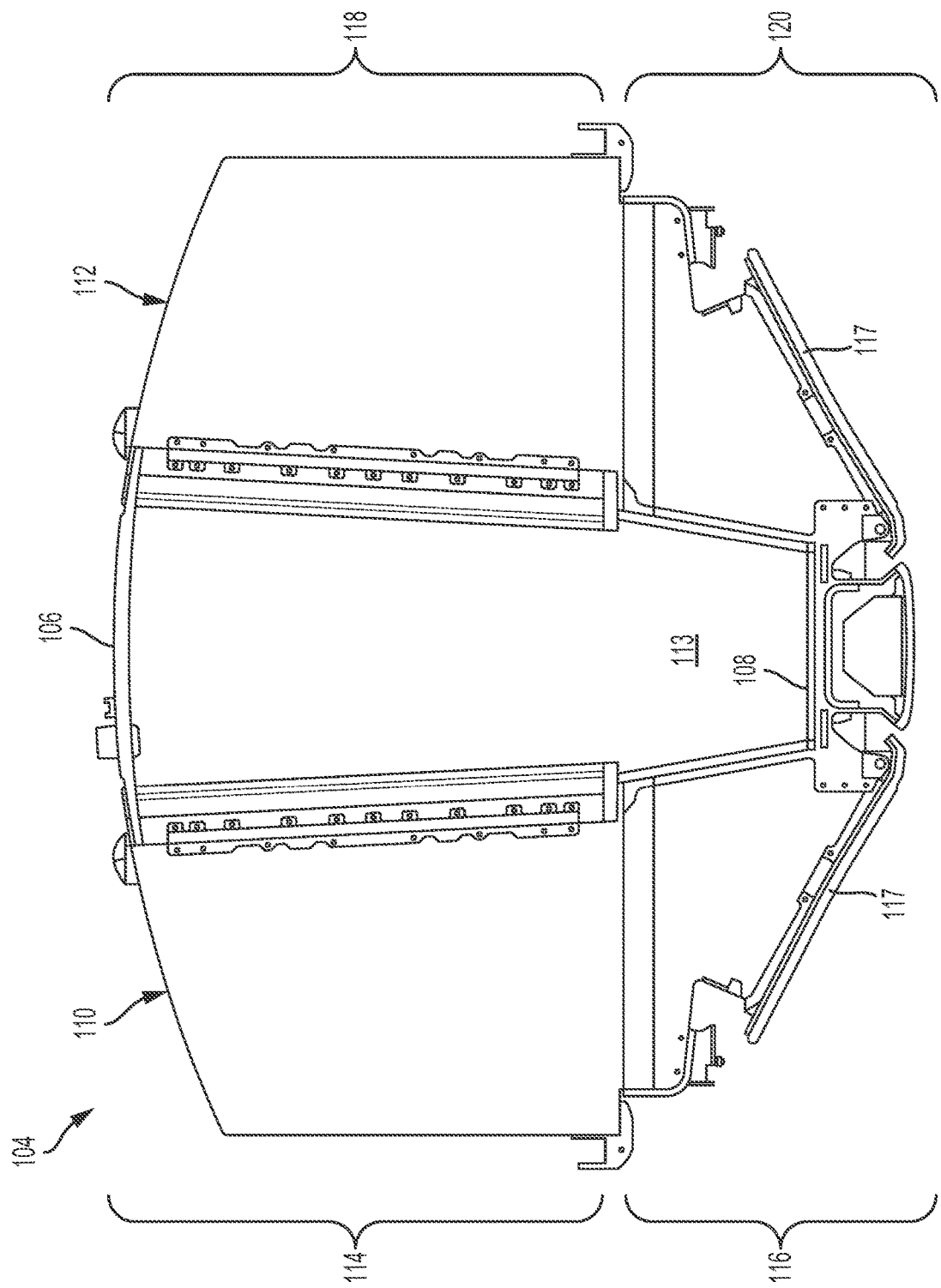
FIG. 2 is a front view of an overhead payload module, according to an example implementation.

FIG. 2 is a front view of an overhead payload module 104, according to an example implementation. As shown, the overhead payload module 104 includes a ceiling assembly 106, an aisle floor assembly 108, a first payload assembly 110, and a second payload assembly 112.

As shown, the first payload assembly 110 is attached to the ceiling assembly 106 and the aisle floor assembly 108 on one side of the ceiling assembly 106 and the aisle floor assembly 108, thus forming a first side of the overhead payload module 104. Further, the second payload assembly 112 is attached to the ceiling assembly 106 and the aisle floor assembly 108 on the opposite side of the ceiling assembly 106 and the aisle floor assembly 108, thus forming a second side of the overhead payload module 104. In addition, the positioning of the first payload assembly 110 and the second payload assembly 112 opposite each other forms an aisle 113 between the first payload assembly 110 and the second payload assembly 112. Any two or more of these assembles could be attached by way of one or more fasteners or by other means.

The first payload assembly 110 and the second payload assembly 112 each includes a respective payload module and a respective overhead stowbin module, which are designated by brackets in FIG. 2. In particular, the first payload assembly 110 includes a first payload module 114 and a first overhead stowbin module 116. The first overhead stowbin module 116 may define a first stowage area that is configured to receive stowbins and that is accessible via a main cabin area of the aircraft 100 (e.g., main cabin area 121 shown in FIG. 3). As an example, FIG. 2 shows a representative stowbin 117 installed in the first overhead stowbin module 116. Further, the second payload assembly 112 includes a second payload module 118 and a second overhead stowbin module 120. The second overhead stowbin module 116 may define a second stowage area that is configured to receive stowbins and that is accessible via a main cabin area of the aircraft 100. As an example, FIG. 2 shows a representative stowbin 117 installed in the second overhead stowbin module 120. Although not shown in FIG. 2, more stowbins can be installed in each overhead stowbin module.

As shown, the first overhead stowbin module 116 is structurally integrated with the first payload module 114, and the second overhead stowbin module 120 is structurally integrated with the second payload module 118.

Various components of the overhead payload module 104 described herein could be structurally integrated. In some examples, structurally integrated means that the payload modules 114, 118 and the overhead stowbin modules 116, 120 are attached prior to installation into the aircraft 100 so that the overhead payload module 104 can be installed in the aircraft 100 as a single component or piece. Additionally or alternatively, structurally integrated means that the first payload module 114 is manufactured as one integral component and the first overhead stowbin module 116 is manufactured as one integral component, and the two components are attached (e.g., bolted) together prior to installation in the aircraft 100, and likewise, the second payload module 118 is manufactured as one integral component and the second overhead stowbin module 120 is manufactured as one integral component, and the two components are attached together prior to installation in the aircraft 100. Additionally or alternatively, structurally integrated means that at least one component of the first payload module 114 is integrally formed with at least one component of the first overhead stowbin module 116 as a single contiguous component, and likewise, at least one component of the second payload module 116 is integrally formed with at least one component of the second overhead stowbin module 120 as a single contiguous component. By way of example, as will be discussed in more detail below, a side wall of a payload module could be integrally formed with an end wall of an overhead stowbin module. Additionally or alternatively, structurally integrated means that at least one component that forms the first payload module 114 could also be a component that forms the first overhead stowbin module 116, and likewise, at least one component that forms the second payload module 118 could also be a component that forms the second overhead stowbin module 120. For example, a floor panel of a payload module could also serve as a ceiling of an overhead stowbin module, and thus the payload module and overhead stowbin module share the floor panel component. Other examples are possible as well.

Having the overhead stowbin modules structurally integrated with the payload modules can minimize the amount of structures in the aircraft 100, eliminate redundancies in components, reduce the weight of the overhead payload module 104, and make the overhead payload module 104 less costly and more efficient to manufacture. Further, this integration can reduce the time and manual work spent installing the overhead payload module 104, in part because one single structure—namely, the overhead payload module 104—need be mounted within the aircraft 100. Other advantages are possible as well.

Moreover, the structural integration of the overhead stowbin modules with the payload modules can further increase structural efficiency by enabling various commodities of the aircraft 100 to be integrated with the overhead payload module 104. For example, main cabin ceilings, lighting, ducts, wiring, and/or other miscellaneous components can be carried by the overhead payload module 104.

Figure 3:
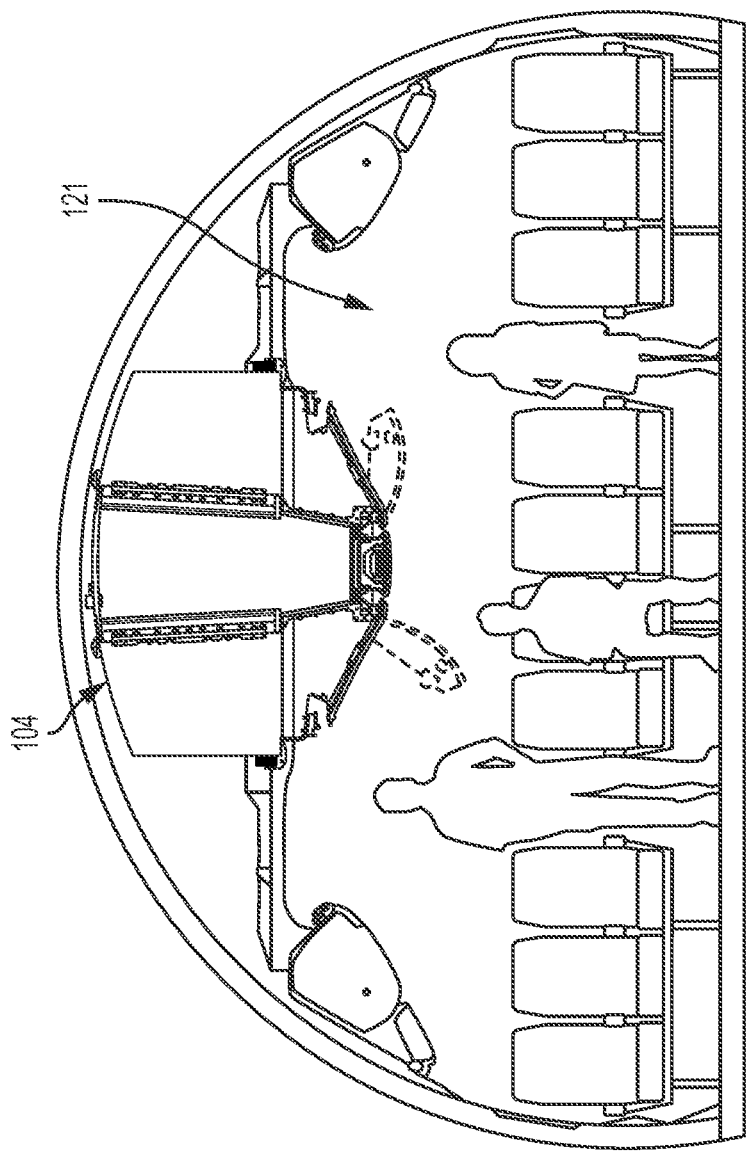
FIG. 3 is a front view of a cross-section of the aircraft where the overhead payload module is positioned in a fuselage of the aircraft, according to an example implementation.

FIG. 3 is a front view of a cross-section of the aircraft 100 where the overhead payload module 104 is positioned in the fuselage 102 of the aircraft 100, according to an example implementation. As shown, the aircraft 100 includes a main cabin area 121 and the overhead payload module 104 is poisoned in the aircraft 100 above the main cabin area 121. More particularly, the overhead payload module 104 is positioned such that the ceiling assembly 106 is positioned proximate to an interior surface of the fuselage 102 (e.g., the surface of the fuselage 102 that is facing the interior of the aircraft 100). For example, the overhead payload module 104 may be positioned such that it abutting/contacting the interior surface of the fuselage 102, or such that it is within a threshold distance (e.g., 25.4 millimeters) from the interior surface of the fuselage 102. The ceiling assembly 106 could be positioned such that it is either directly adjacent to the fuselage 102 or positioned with other materials in between the ceiling assembly 106 and the fuselage 102. Further, the overhead payload module 104 is positioned such that the aisle floor assembly 108 is directly, or almost directly, above the main cabin area 121. With the overhead payload module 104 positioned in the manner shown in FIG. 3, stowbins that are inserted into the overhead payload module 104 can be accessed via the main cabin area 121.

The overhead payload module 104 can be secured within the aircraft 100 above the main cabin area 121 of the aircraft 100, and can be secured in various ways, such as being secured to a support rail assembly or other support structure. A support rail assembly is not shown in FIG. 3, but is described in more detail in later Figures.

Figure 4:
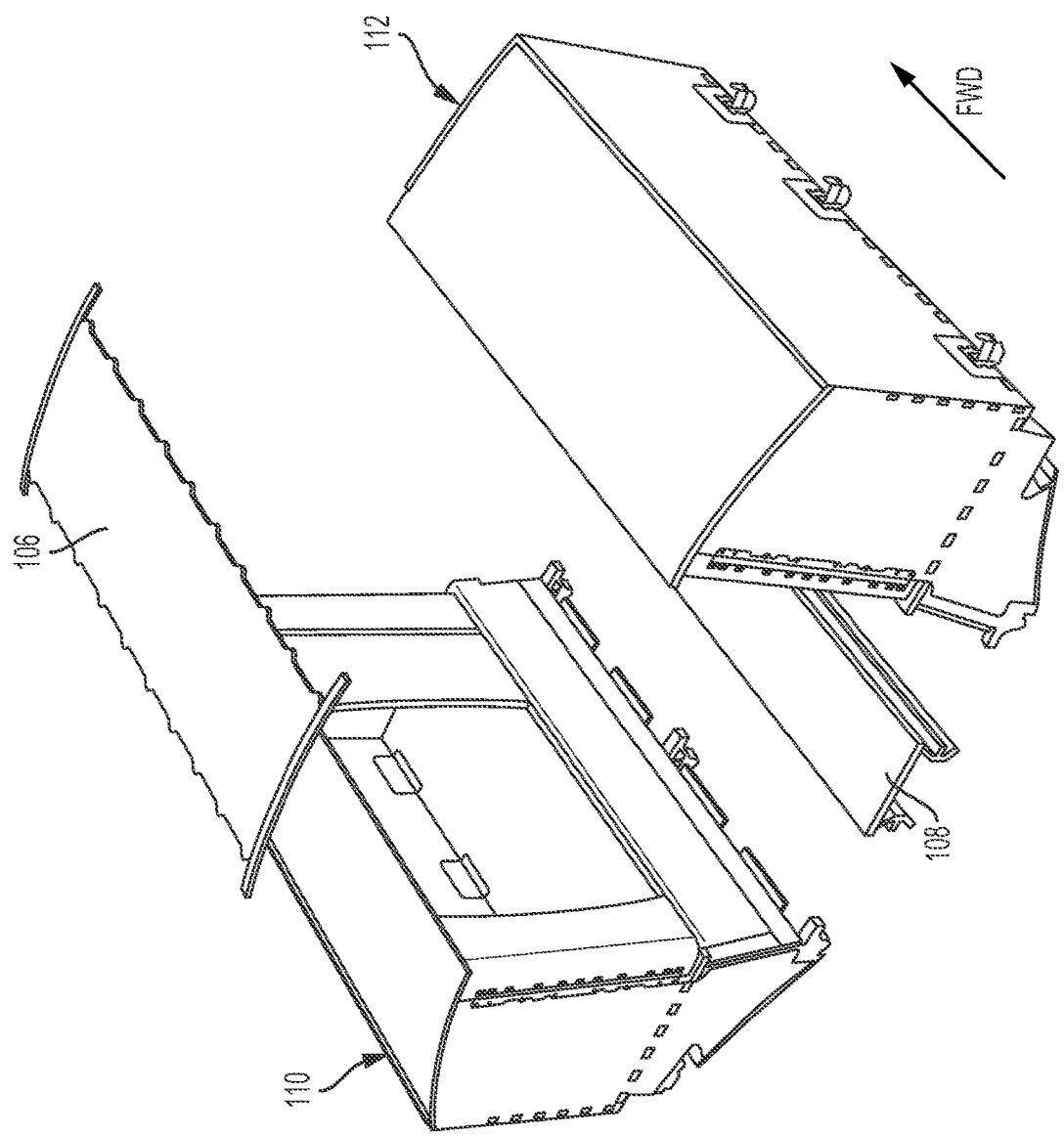
FIG. 4 is an exploded view of the overhead payload module, according to an example implementation.

FIG. 4 is an exploded view of the overhead payload module 104, according to an example implementation. The exploded view of the overhead payload module 104 shows the ceiling assembly 106, the aisle floor assembly 108, the first payload assembly 110, and the second payload assembly 112 as separate components. It should be understood that two or more of these assemblies could be manufactured such that they are integrally formed rather than being separate components that are assembled together to form the overhead payload module 104.

Figure 5:
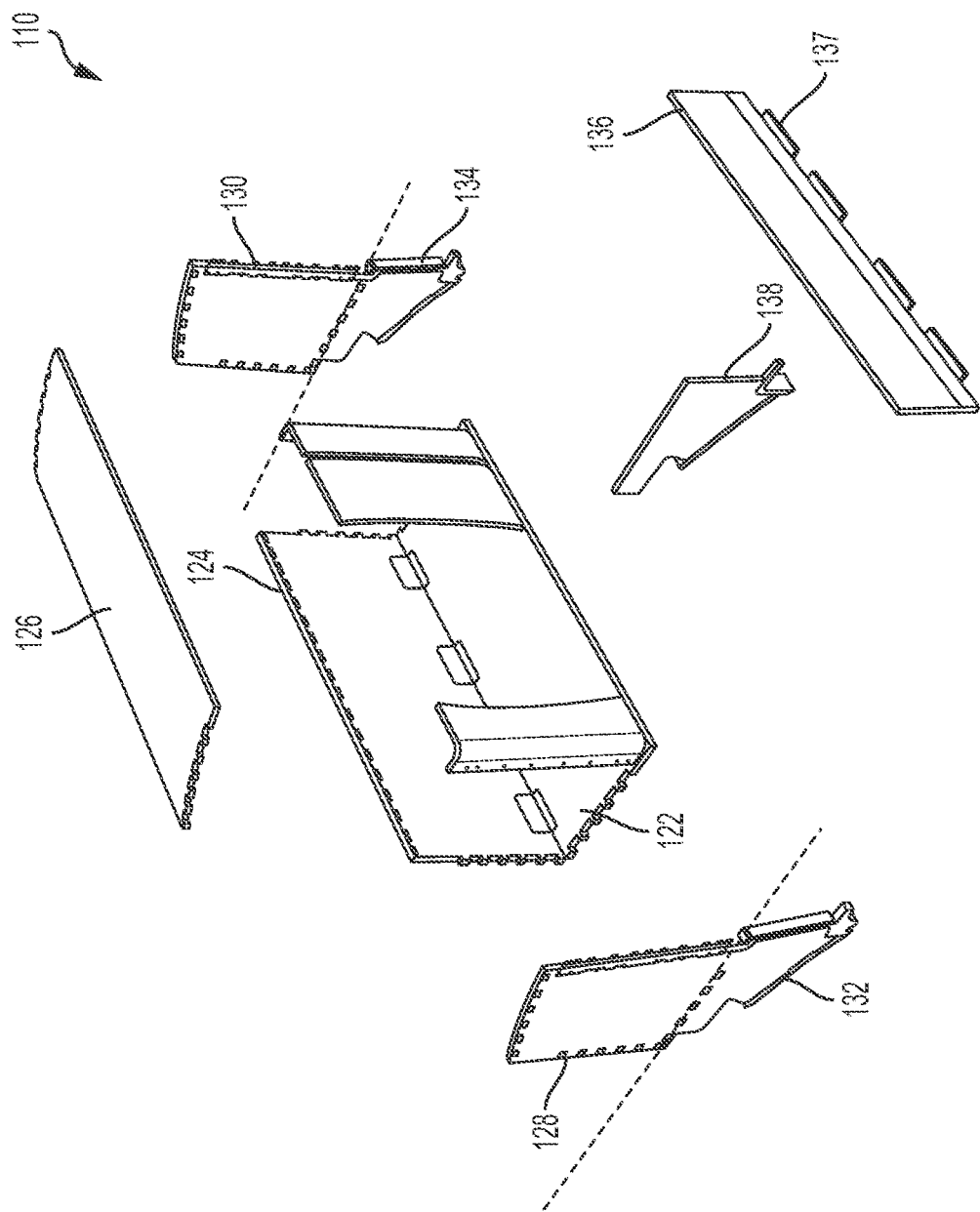
FIG. 5 is an exploded view of a first payload assembly of the overhead payload module, according to an example implementation.

FIG. 5 is an exploded view of the first payload assembly 110 of the overhead payload module 104, according to an example implementation. As shown, the first payload assembly 110 comprises a first floor panel 122, a first back wall 124, a first ceiling 126, a first pair of side walls 128, 130 that together form the first payload module 114 portion of the first payload assembly 110. Further, the first payload assembly 110 comprises a first pair of end walls 132, 134 and a first stowbin side wall 136 that together form the first overhead stowbin module 116. In addition, the first pair of end walls 132, 134, the first stowbin side wall 136, and the first floor panel 122 together define a first stowage area underneath the first floor panel 122 configured to receive stowbins and accessible via the main cabin area 121 of the aircraft 100. In addition to or alternative to the components shown in FIG. 5, the first payload assembly 110 can include other walls or other structures, depending on the type of payload area defined. For instance, the first payload module 114 may include other walls that enclose a crew rest space.

As shown, one side wall 128 of the first pair of side walls 128, 130 is integrally formed with one end wall 132 of the first pair of end walls 132, 134. And the other side wall 130 of the first pair of side walls 128, 130 is integrally formed with the other end wall 134 of the first pair of end walls 132, 134. Having this type of integral formation can provide increased structural integrity to the first payload assembly 110 and the aisle area of the overhead payload module 104, such as by reinforcing the first stowbin side wall 136, and possibly in turn the aisle floor assembly 108. However, in alternative implementations, the side walls of the first pair of side walls 128, 130 may be independent from the end walls of the first pair of end walls 132, 134, and thus independently attached when assembling the first payload assembly 110.

Further, as shown in FIG. 5, a first plurality of supplemental brackets, including representative supplemental bracket 137, are attached to the first stowbin side wall 136. Each supplemental bracket of the first plurality of supplemental brackets has a first arm attached to the first stowbin side wall 136 and a second arm that can be attached to the aisle floor assembly 108. For example, when the first payload assembly 110 is attached to the aisle floor assembly 108, the second arms of the supplemental brackets can be attached to an underside of the aisle floor assembly.

As also shown in FIG. 5, the first payload assembly 110 or, more particularly, the first overhead stowbin module 116, includes a first center support wall 138. The first center support wall 138 can be attached to the first stowbin side wall 136 at a position between the first pair of end walls 132, 134 such that the first stowage area is divided into two stowage areas that are each configured to receive stowbins. The first center support wall 138, when attached, can be substantially perpendicular to the first stowbin side wall 136 and substantially parallel to the first pair of end walls 132, 134. Within examples, the first center support wall 138 can be positioned to be substantially equidistant from each of the first pair of end walls 132, 134, or could be positioned at a different location.

In line with the discussion above, the first pair of end walls 132, 134, and additionally the first center support wall 138, can increase the structural integrity of the first payload assembly 110. For example, these components provide vertical support means that also structurally reinforce the aisle, particularly at the corners where the first stowbin side wall 136 is coupled to the first floor panel 122 and the aisle floor assembly 108. Overall, this can help increase the load-carrying capability of the overhead payload module 104. Further, the first plurality of supplemental brackets provide additional structural support for the aisle as well.

In alternative implementations, the first payload assembly 110 could include more or less components, or could be assembled in a different manner. For instance, an example alternative implementation might not include the first center support wall 138, or might include additional support walls between the first pair of end walls 132, 134.

Figure 6:
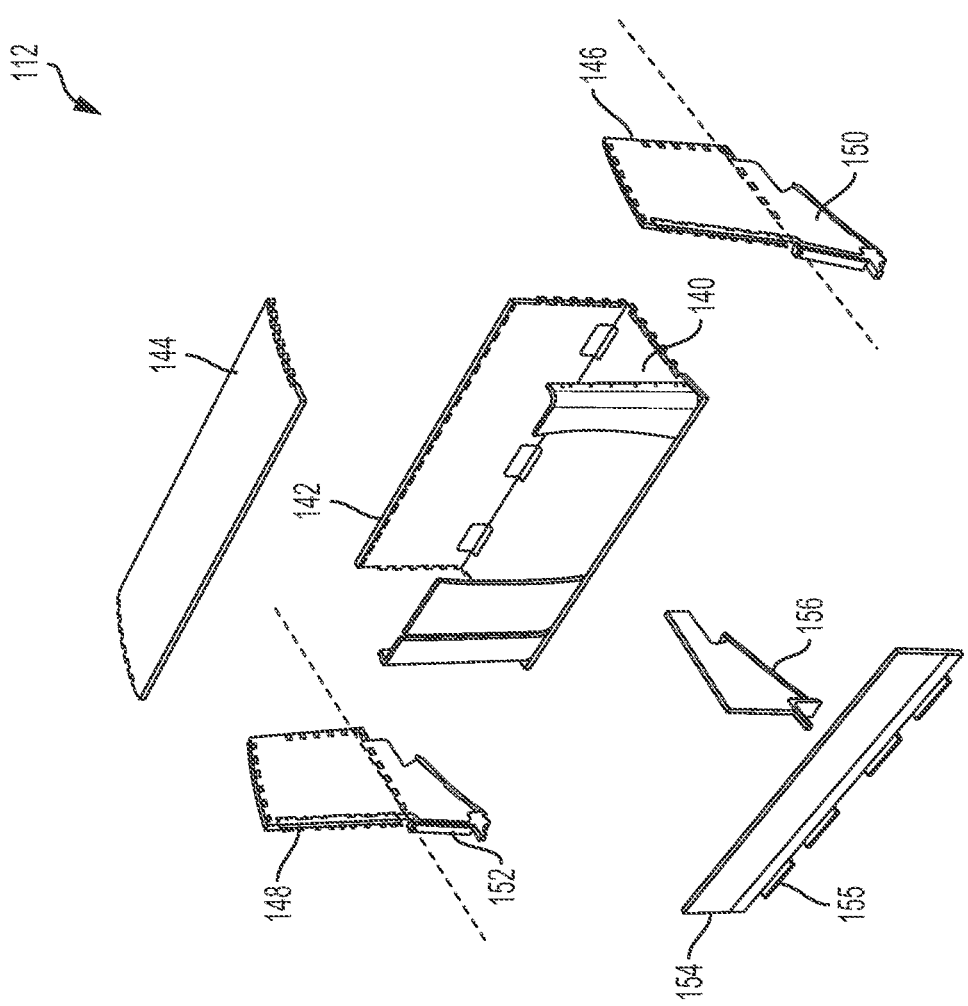
FIG. 6 is an exploded view of a second payload assembly of the overhead payload module, according to an example implementation.

FIG. 6 is an exploded view of the second payload assembly 112 of the overhead payload module 104, according to an example implementation. As shown, the second payload assembly 112 comprises a second floor panel 140, a second back wall 142, a second ceiling 144, a second pair of side walls 146, 148 that together form the second payload module 118 portion of the second payload assembly 112. Further, the second payload assembly 112 comprises a second pair of end walls 150, 152 and a second stowbin side wall 154 that together form the second overhead stowbin module 120. In addition, the second pair of end walls 150, 152, the second stowbin side wall 154, and the second floor panel 140 together define a second stowage area underneath the second floor panel 140 configured to receive stowbins and accessible via the main cabin area 121 of the aircraft 100. In addition to or alternative to the components shown in FIG. 6, the second payload assembly 112 can include other walls or other structures, depending on the type of payload area defined. For instance, the second payload module 118 may include other walls that enclose a crew rest space.

As shown, one side wall 146 of the second pair of side walls 146, 148 is integrally formed with one end wall 132 of the second pair of end walls 150, 152. And the other side wall 148 of the second pair of side walls 146, 148 is integrally formed with the other end wall 134 of the second pair of end walls 150, 152. Having this type of integral formation can provide increased structural integrity to the second payload assembly 112, such as by reinforcing the second stowbin side wall 154, and possibly in turn the aisle floor assembly 108. However, in alternative implementations, the side walls of the second pair of side walls 146, 148 may be independent from the end walls of the second pair of end walls 150, 152, and thus independently attached when assembling the second payload assembly 112.

Further, as shown in FIG. 6, a second plurality of supplemental brackets, including representative supplemental bracket 155, are attached to the second stowbin side wall 154. Each supplemental bracket of the second plurality of supplemental brackets has a second arm attached to the second stowbin side wall 154 and a second arm that can be attached to the aisle floor assembly 108. For example, when the second payload assembly 112 is attached to the aisle floor assembly 108, the second arms of the supplemental brackets can be attached to an underside of the aisle floor assembly.

As also shown in FIG. 6, the second payload assembly 112 or, more particularly, the second overhead stowbin module 120, includes a second center support wall 156. The second center support wall 156 can be attached to the second stowbin side wall 154 at a position between the second pair of end walls 150, 152 such that the second stowage area is divided into two stowage areas that are each configured to receive stowbins. The second center support wall 156, when attached, can be substantially perpendicular to the second stowbin side wall 154 and substantially parallel to the second pair of end walls 150, 152. Within examples, the second center support wall 156 can be positioned to be substantially equidistant from each of the second pair of end walls 150, 152, or could be positioned at a different location.

In line with the discussion above, the second pair of end walls 150, 152, and additionally the second center support wall 156, can increase the structural integrity of the second payload assembly 112. For example, these components provide vertical support means that also structurally reinforce the aisle, particularly at the corners where the second stowbin side wall 154 is coupled to the second floor panel 140 and the aisle floor assembly 108. Overall, this can help increase the load-carrying capability of the overhead payload module 104. Further, the second plurality of supplemental brackets can provide additional structural support for the aisle as well.

In alternative implementations, the second payload assembly 112 could include more or less components, or could be assembled in a different manner. For instance, some implementations might not include the second center support wall 156, or might include additional support walls between the second pair of end walls 150, 152.

Figure 7:
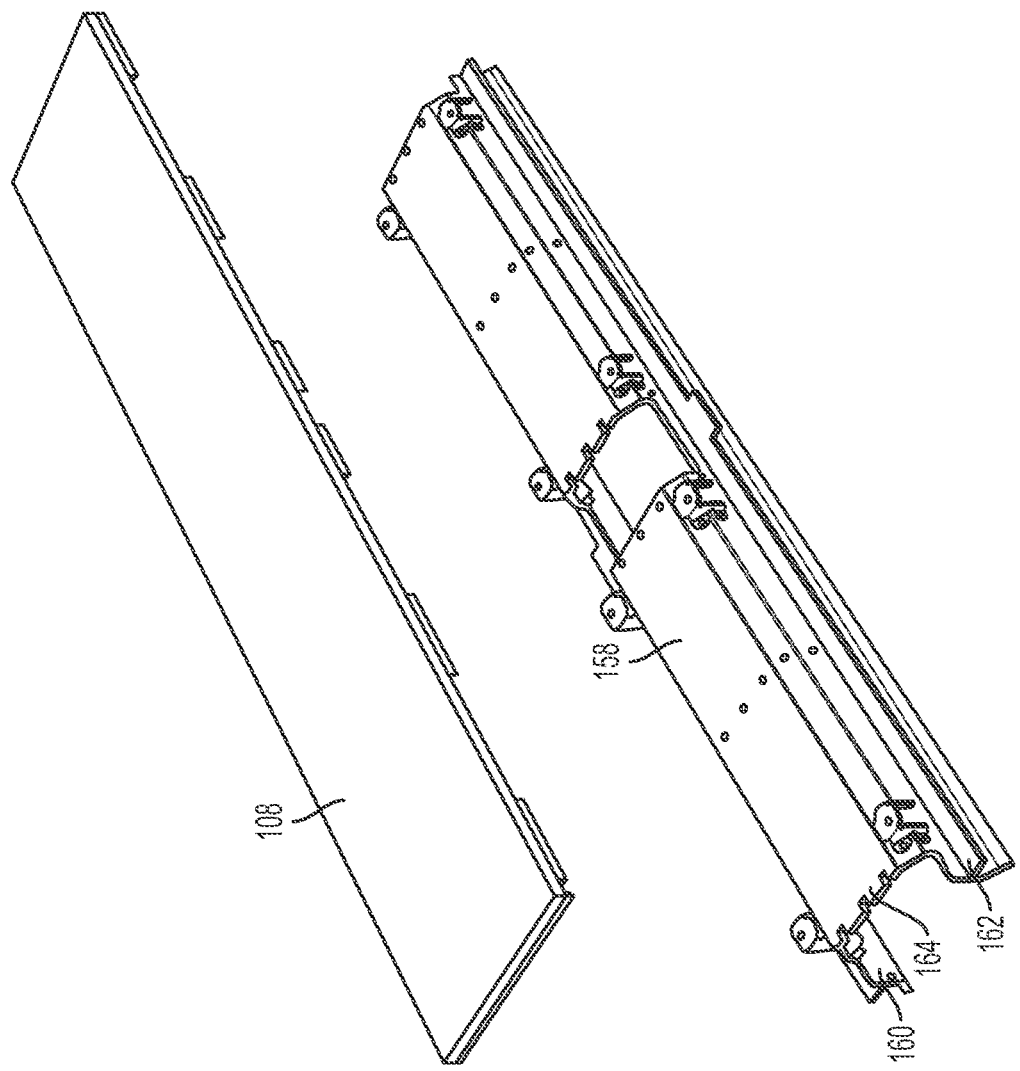
FIG. 7 is a perspective view of a passenger service unit (PSU) support assembly attachable to an aisle floor assembly of the overhead payload module, according to an example implementation.

FIG. 7 is a perspective view of a PSU support assembly 158 attachable to an aisle floor assembly 108 of the overhead payload module 104, according to an example implementation. As shown, the PSU support assembly 158 can be attached on an underside of the aisle floor assembly 108. The PSU support assembly 158 includes two side structures 160, 162 and an intermediate structure 164 connecting the two side structures 160, 162. Together, the two side structures 160, 162 define a trough-shaped space configured to receive a PSU. The PSU can be a unit of the aircraft 100 above an aisle in the main cabin area 121 that includes various components such as reading lights, loudspeakers, illuminated signs, and/or environmental control system components such as air conditioning vents that regular air and/or pressure.

Figure 8:
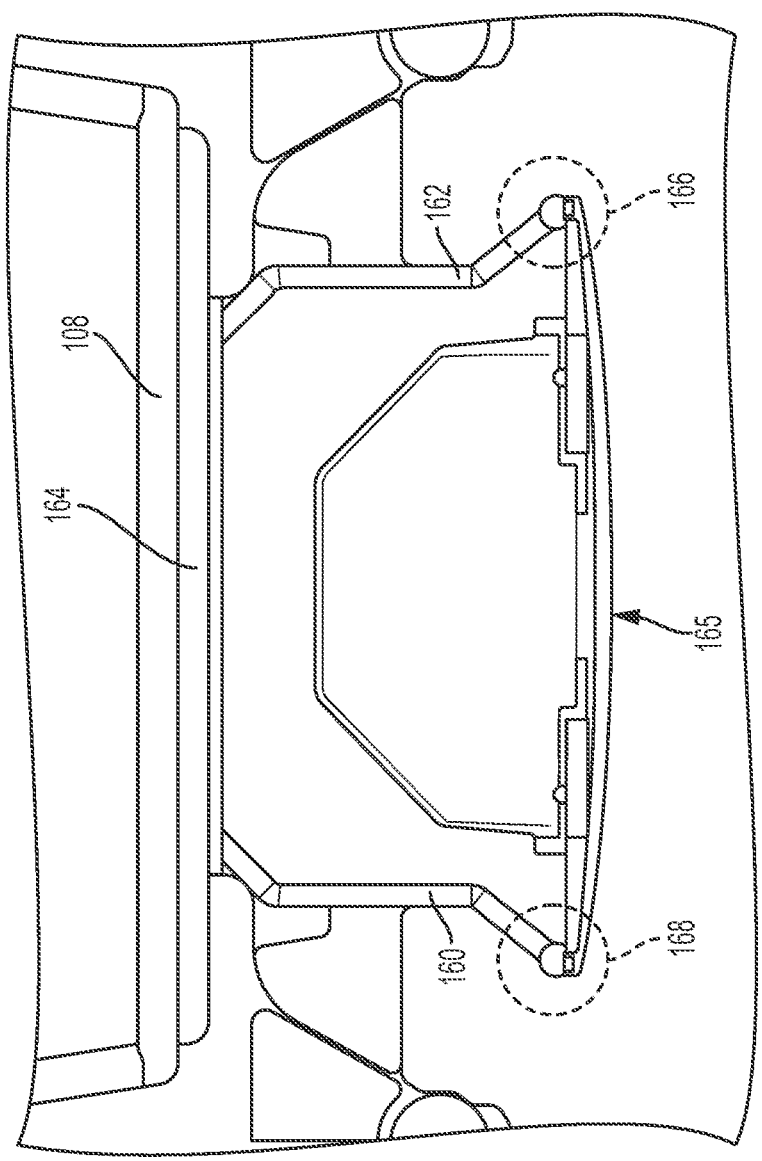
FIG. 8 is a front view of the PSU support assembly housing a PSU, according to an example implementation.

FIG. 8 is a front view of a PSU support assembly 158 housing a PSU 165, according to an example implementation. The PSU support assembly 158 is attached to the aisle floor assembly 108. To facilitate integration of the PSU 165 into the PSU support assembly 158, a distal end of one of the two side structures 160, 162, such as distal end 166, can be configured to couple to a hinge of the PSU 165 and enable the PSU 165 to rotate about the hinge. Further, a distal end of the other of the two side structures 160, 162, such as distal end 168, can be configured to receive latches of the PSU 165 for securing the PSU 165 to the PSU support assembly 158.

In addition to the end walls and center support walls described above, the overhead payload module 104 can include additional components, such as a plurality of aisle support structures, that improve the strength and reinforcement of the aisle. Due to high loads that could be placed on the overhead payload module 104 or similar structure in practice. Further, the end walls, center support walls, and other components described herein can increase the stiffness of the aisle as well, such that the resonant frequency of the aisle structure has a reduced resonant frequency that is different from the resonant frequency of the aircraft 100.

Figure 9:
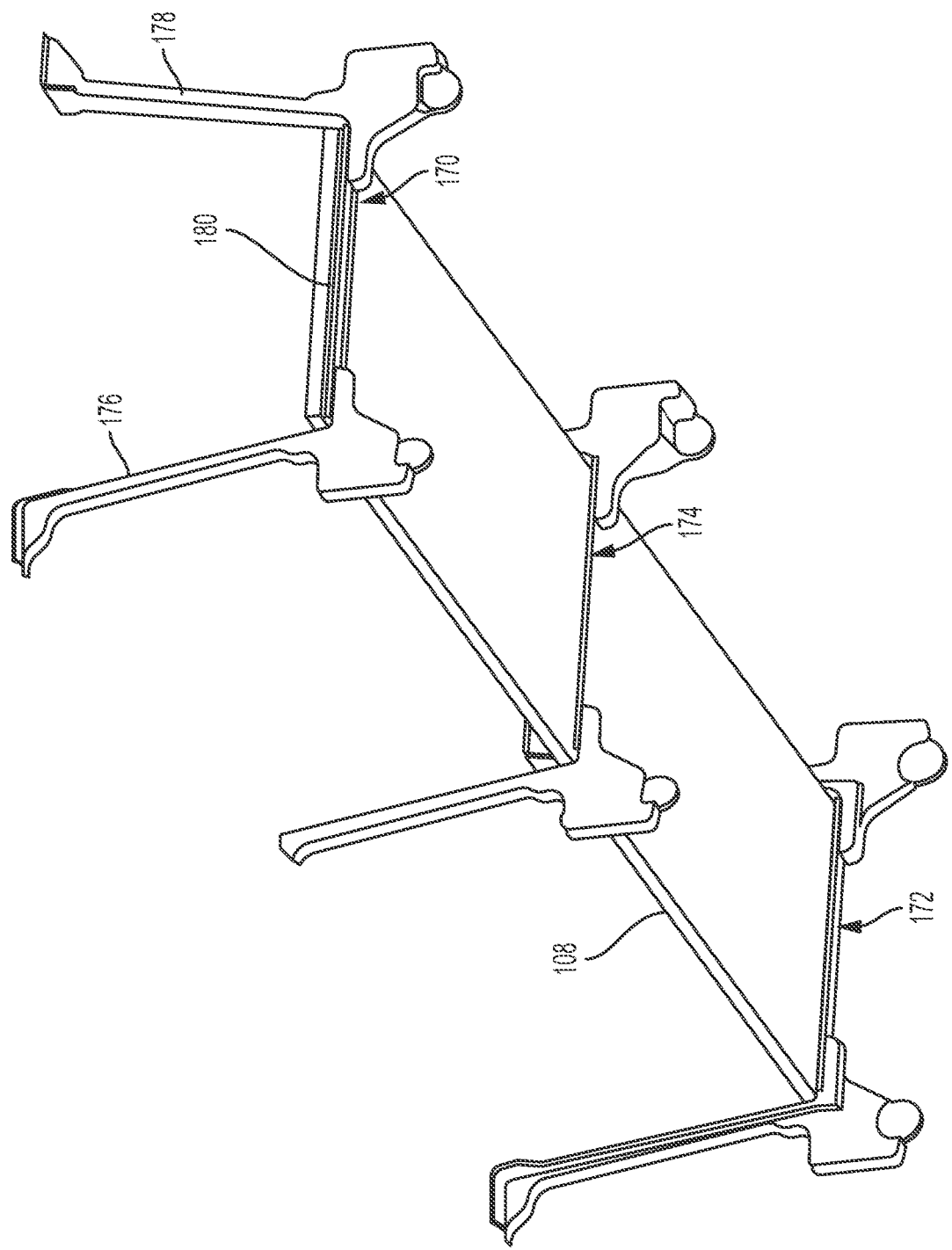
FIG. 9 is a perspective view of a plurality of aisle support structures attached along a length of the aisle floor assembly, according to an example implementation.

FIG. 9 is a perspective view of a plurality of aisle support structures attached along a length of the aisle floor assembly 108, according to an example implementation. In particular, the plurality of aisle support structures includes a first aisle support structure 170, a second aisle support structure 172, and a center aisle support structure 174. As shown, each of the plurality of aisle support structures 170, 172, 174 includes (i) a first support bracket, such as representative first support bracket 176, (ii) a second support bracket positioned opposite the first support bracket, such as representative second support bracket 178, and (iii) a cross member attached between the aisle floor assembly 108 and the first and second support brackets, such as representative cross member 180.

As shown the center aisle support structure 174 is positioned substantially equidistant from the first aisle support structure 170 and the second aisle support structure 172. In alternative implementations, however, the center aisle support structure 174 could be positioned elsewhere.

Figure 10:
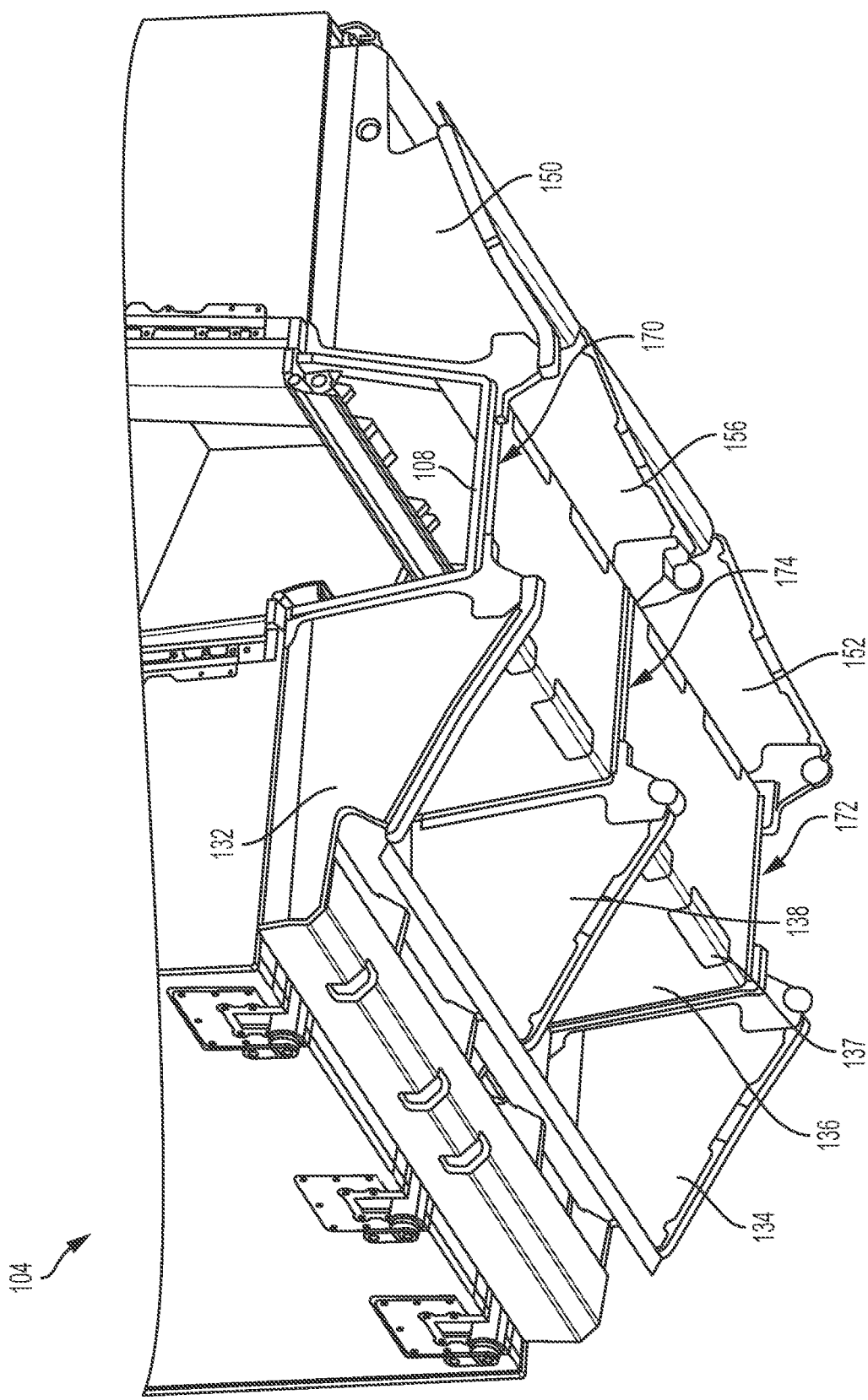
FIG. 10 is a perspective view of the plurality of aisle support structures attached to the overhead payload module along a length of the aisle floor assembly, according to an example implementation.

FIG. 10 is a perspective view of the plurality of aisle support structures 170, 172, 174 attached to the aisle floor assembly 108 and to other components of the overhead payload module 104, according to an example implementation. As shown, one support bracket of the first aisle support structure 170 is attached to end wall 132 of the first pair of end walls 132, 134, and the other support bracket of the first aisle support structure 170 is attached to end wall 150 of the second pair of end walls 150, 152. Further, one support bracket of the second aisle support structure 172 is attached to end wall 134 of the first pair of end walls 132, 134, and the other support bracket of the second aisle support structure 172 is attached to end wall 152 of the second pair of end walls 150, 152. Still further, one support bracket of the center aisle support structure 174 is attached to the first center support wall 138 and the other support bracket of the center aisle support structure 174 is attached to the second center support wall 156.

In some implementations, one or more support brackets on the side of the overhead payload module 104 where the first payload assembly is located can also be attached to a first stowbin side wall 136. Likewise, one or more support brackets on the side of the overhead payload module 104 where the second payload assembly is located can also be attached to a second stowbin side wall 154. Doing so might provide even more support for the aisle and even further increase the structural integrity and/or the load-carrying capability of the overhead payload module 104. Alternatively, some or all of the support brackets may contact the stowbin side walls without being attached.

Figure 11:
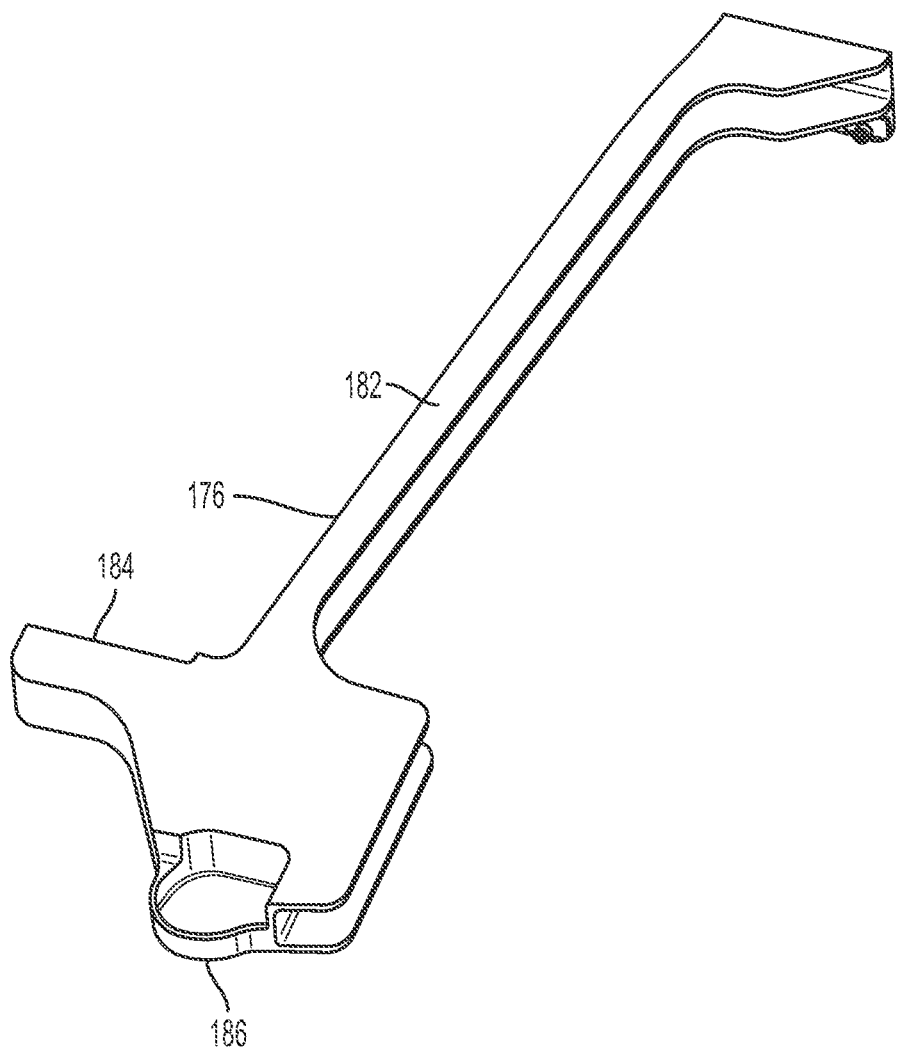
FIG. 11 is a perspective view of a representative support bracket of an aisle support structure of the plurality of aisle support structures, according to an example implementation.

FIG. 11 is a perspective view of representative first support bracket 176 of the first aisle support structure 170, according to an example implementation. However, the support bracket shown in FIG. 11 is a form that any of the respective first support brackets of the plurality of aisle support structures 170, 172, 174 could take. As shown, the first support bracket 176 includes a first arm 182 that, if located on the side of the overhead payload module 104 where the first payload assembly is located, can be attached to the first payload assembly 110 (e.g., to end wall 132, end wall 134, or the first center support wall 138), or, if located on the side of the overhead payload module 104 where the second payload assembly is located, can be attached to the second payload assembly 112 (e.g., to end wall 150, end wall 152, or the second center support wall 156). The first support bracket 176 also includes a second arm 184 that can be attached to the aisle floor assembly 108.

In addition, the first support bracket 176 includes a first stowbin pivot fitting 186 integrally formed with the first arm 182 and the second arm 184. The first stowbin pivot fitting 186 defines an axis about which a stowbin can rotate when the stowbin is rotatably attached to the first stowbin pivot fitting 186.

Figure 12:
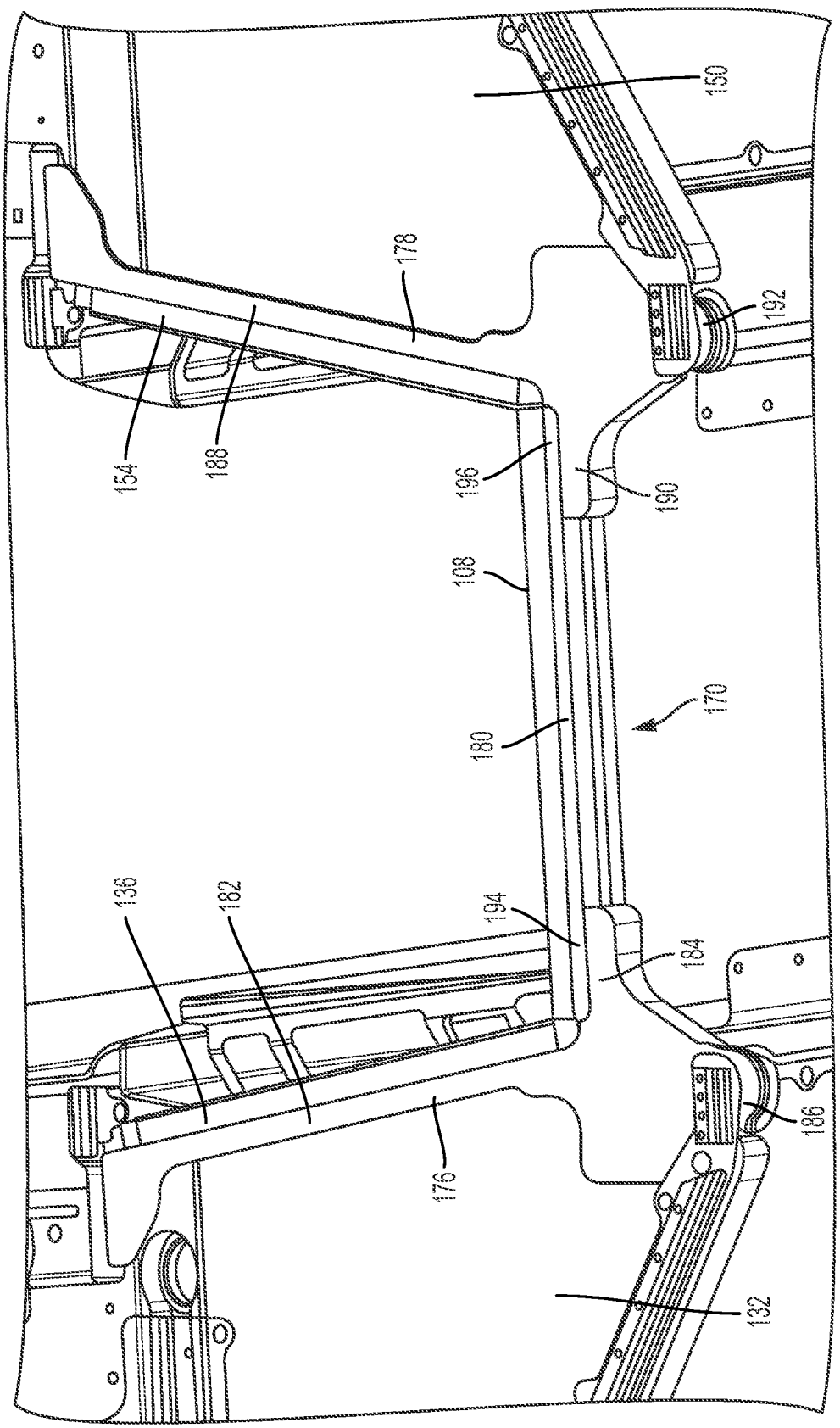
FIG. 12 is another perspective view of the aisle support structure, according to an example implementation.

FIG. 12 is another perspective view of the first aisle support structure 170, according to an example implementation. In addition to showing the first arm 182, the second arm 184, and the first stowbin pivot fitting 186 of the first support bracket 176, FIG. 12 shows a first arm 188, a second arm 190, and a second stowbin pivot fitting 192 of the second support bracket 178. It should be noted that the second support bracket 178 in FIG. 12 is a form that any of the respective second support brackets of the plurality of aisle support structures 170, 172, 174 could take. The second stowbin pivot fitting 192 is integrally formed with the first arm 188 and the second arm 190 and defines an axis about which a stowbin can rotate when the stowbin is rotatably attached to the second stowbin pivot fitting 192.

Further, the first arm 182 of the first support bracket 176 is shown to be attached on one side to end wall 132. An opposite side of the first arm 182 has engagement surface with the first stowbin side wall 136. Still further, the first arm 188 of the second support bracket 178 is shown to be attached on one side to end wall 150. An opposite side of the first arm 188 has an engagement surface with the second stowbin side wall 154. In alternative implementations, however, the first arm 182 of the first support bracket 176 could be attached to the first stowbin side wall 136, and the first arm 188 of the second support bracket 178 could be attached to the second stowbin side wall 154.

Also shown in FIG. 12 is the cross member 180 of the first aisle support structure 170. In particular, the cross member 180 has a first end portion 194 attached between the aisle floor assembly 108 and the first support bracket 176 (namely, between the aisle floor assembly 108 and the second arm 184 of the first support bracket 176). Further, the cross member 180 has a second end portion 196 attached between the aisle floor assembly 108 and the second support bracket 178 (namely, between the aisle floor assembly 108 and the second arm 190 of the second support bracket 178). In some implementations, the length of the first arms 182, 188 and the second arms 184, 190 may vary. For instance, the second arms 184, 190 may extend further towards each other, thereby contacting a larger surface of the cross member 180.

The cross member 180, along with any other cross members of any other aisle support structures along the length of the aisle floor assembly 108, can provide support underneath the aisle floor assembly 108, and strengthen and stiffen the aisle. Furthermore, each aisle support structure can serve as a load path from one side of the overhead payload module 104 to the other, to help the overhead payload module 104 carry loads.

In some implementations, one or more first arms of the support brackets on the side of the overhead payload module 104 where the first payload assembly is located could include a surface (e.g., a flat, rectangular surface) on which the first floor panel 122 can rest or to which the first floor panel 122 could be attached. Likewise, one or more second arms of the support brackets on the side of the overhead payload module 104 where the second payload assembly is located could include such a surface on which the second floor panel 140 can rest or to which the second floor panel 140 could be attached.

The above-described arrangement and attachments of support structures, namely, the aisle support structures shown in FIGS. 9-12, can provide various advantages, such as improving the strength and reinforcement of the aisle as discussed above. Further, the support brackets of these structures can resist rotation, and a rotational moment of inertia at the corners of the aisle (e.g., where the second stowbin side wall 154 is coupled to the second floor panel 140 and the aisle floor assembly 108) can be increased.

Figure 13:
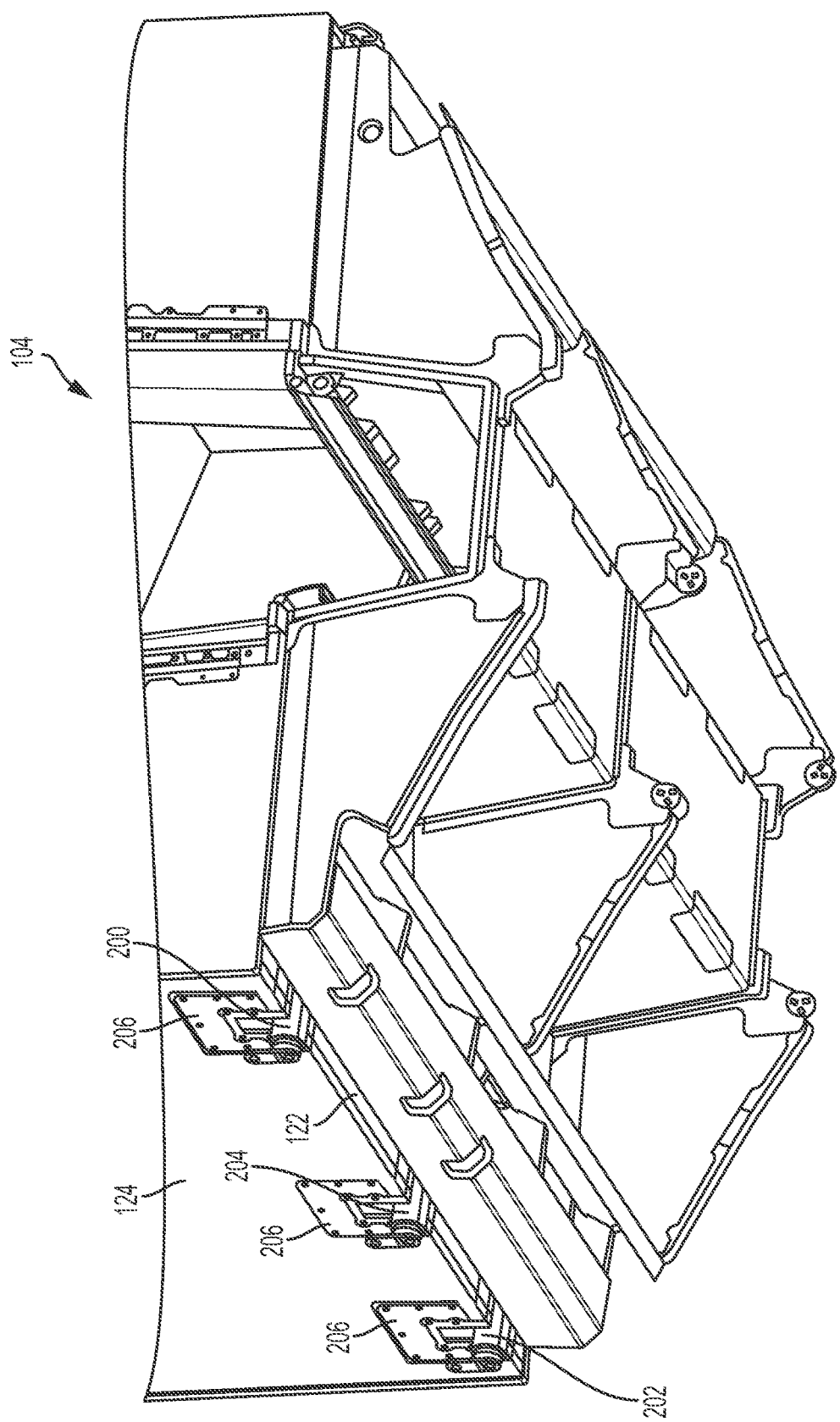
FIG. 13 is a perspective view of the overhead payload module including a first plurality of blade fittings, according to an example implementation.

FIG. 13 is a perspective view of the overhead payload module 104 including a first plurality of blade fittings 200, 202, 204, according to an example implementation. In particular, the first plurality of blade fittings 200, 202, 204 are attached along a length of an exterior of the overhead payload module 104 on the side of the overhead payload module 104 where the first payload assembly is located. The first plurality of blade fittings 200, 202, 204 includes a first pair of blade fittings 200, 202 and a first center blade fitting 204. In alternative implementations, more or less blade fittings could be attached to the overhead payload module 104 on the side of the overhead payload module 104 where the first payload assembly is located. The first pair of blade fittings 200, 202 are on opposite sides of, and spatially separated from, the first center blade fitting 204.

As shown, each of the first plurality of blade fittings 200, 202, 204 have a bracket portion (e.g., bracket portion 222 shown in FIG. 16 or bracket portion 222 shown in FIG. 19) attached to the first payload module 114. A first bracket arm (e.g., first bracket arm 226 shown in FIG. 16 or first bracket arm 254 shown in FIG. 19) of the bracket portion extends towards a center longitudinal plane of the overhead payload module 104 and is attached to an underside of the first floor panel 122. A second bracket arm (e.g., second bracket arm 228 shown in FIG. 16 or second bracket arm 256 shown in FIG. 19) of the bracket portion is substantially perpendicular to the first bracket arm and attached to an exterior surface of the first back wall 124.

In order to locally strengthen the attachment between each of the first plurality of blade fittings 200, 202, 204 and the overhead payload module 104, one or more optional metal sheets 206, such as aluminum sheets, could be attached between each of the first plurality of blade fittings 200, 202, 204 and the overhead payload module 104 on an exterior of the overhead payload module 104 at the locations where each such blade fitting is attached to the overhead payload module 104. The first plurality of blade fittings 200, 202, 204 could be attached to the overhead payload module 104 after the metal sheets are attached on the exterior of the overhead payload module 104 to one or both of the first floor panel 122 and the first back wall 124. Additionally or alternatively, one or more metal sheets could be attached on an interior of the overhead payload module 104 onto surfaces opposite the surfaces that will engage with the first plurality of blade fittings 200, 202, 204.

Figure 14:
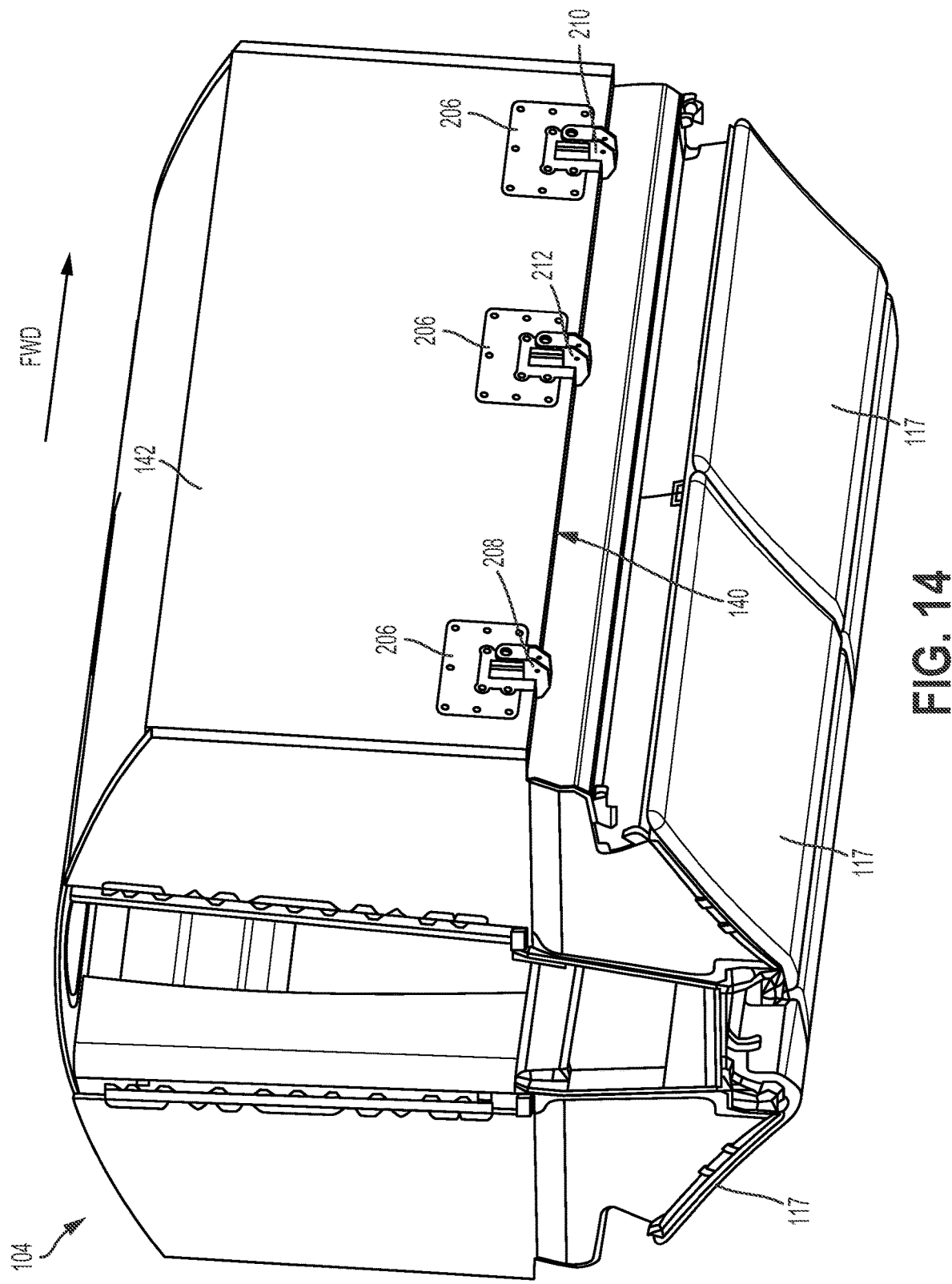
FIG. 14 is another perspective view of the overhead payload module including a second plurality of blade fittings, according to an example implementation.

FIG. 14 is another perspective view of the overhead payload module 104 including a second plurality of blade fittings 208, 210, 212, according to an example implementation. In particular, the second plurality of blade fittings 208, 210, 212 are attached along a length of an exterior of the overhead payload module 104 on the side of the overhead payload module 104 where the second payload assembly is located. The second plurality of blade fittings 208, 210, 212 includes a second pair of blade fittings 208, 210 and a second center blade fitting 212. In alternative implementations, more or less blade fittings could be attached to the overhead payload module 104 on the side of the overhead payload module 104 where the second payload assembly is located. The second pair of blade fittings 208, 210 are on opposite sides of, and spatially separated from, the second center blade fitting 212.

As shown, each of the second plurality of blade fittings 208, 210, 212 have a bracket portion (e.g., bracket portion 222 shown in FIG. 16 or bracket portion 222 shown in FIG. 19) attached to the second payload module 118. A first bracket arm (e.g., first bracket arm 226 shown in FIG. 16 or first bracket arm 254 shown in FIG. 19) of the bracket portion extends towards a center longitudinal plane of the overhead payload module 104 and is attached to an underside of the second floor panel 140. A second bracket arm (e.g., second bracket arm 228 shown in FIG. 16 or second bracket arm 256 shown in FIG. 19) of the bracket portion is substantially perpendicular to the first bracket arm and attached to an exterior surface of the second back wall 142.

In order to locally strengthen the attachment between each of the second plurality of blade fittings 208, 210, 212 and the overhead payload module 104, one or more optional metal sheets 206 could be attached between each of the second plurality of blade fittings 208, 210, 212 and the overhead payload module 104 on an exterior (and/or interior) of the overhead payload module 104 at the locations where each such blade fitting is attached to the overhead payload module 104, such as described above with respect to the first plurality of blade fittings 200, 202, 204.

Although not explicitly shown in FIG. 13 and FIG. 14, the first plurality of blade fittings 200, 202, 204 and the second plurality of blade fittings 208, 210, 212 may be substantially aligned with one another. For instance, blade fitting 200 may be directly opposite blade fitting 208 such that they are aligned (e.g., such that their respective first arms fall along the same axis running through the overhead payload module 104). Blade fitting 202 and blade fitting 210 may be similarly arranged with respect to one another, and blade fitting 204 and blade fitting 212 may be similarly arranged as well with respect to one another. In alternative implementations, the first plurality of blade fittings 200, 202, 204 and the second plurality of blade fittings 208, 210, 212 might not be substantially aligned with one another.

Each of the above-described blade fittings can be configured for attaching to a support rail assembly of the aircraft 100 so as to attach the overhead payload module 104 to the support rail assembly within the aircraft 100.

As also shown in FIG. 14, multiple stowbins 117 are installed in the overhead payload module 104.

Figure 15:
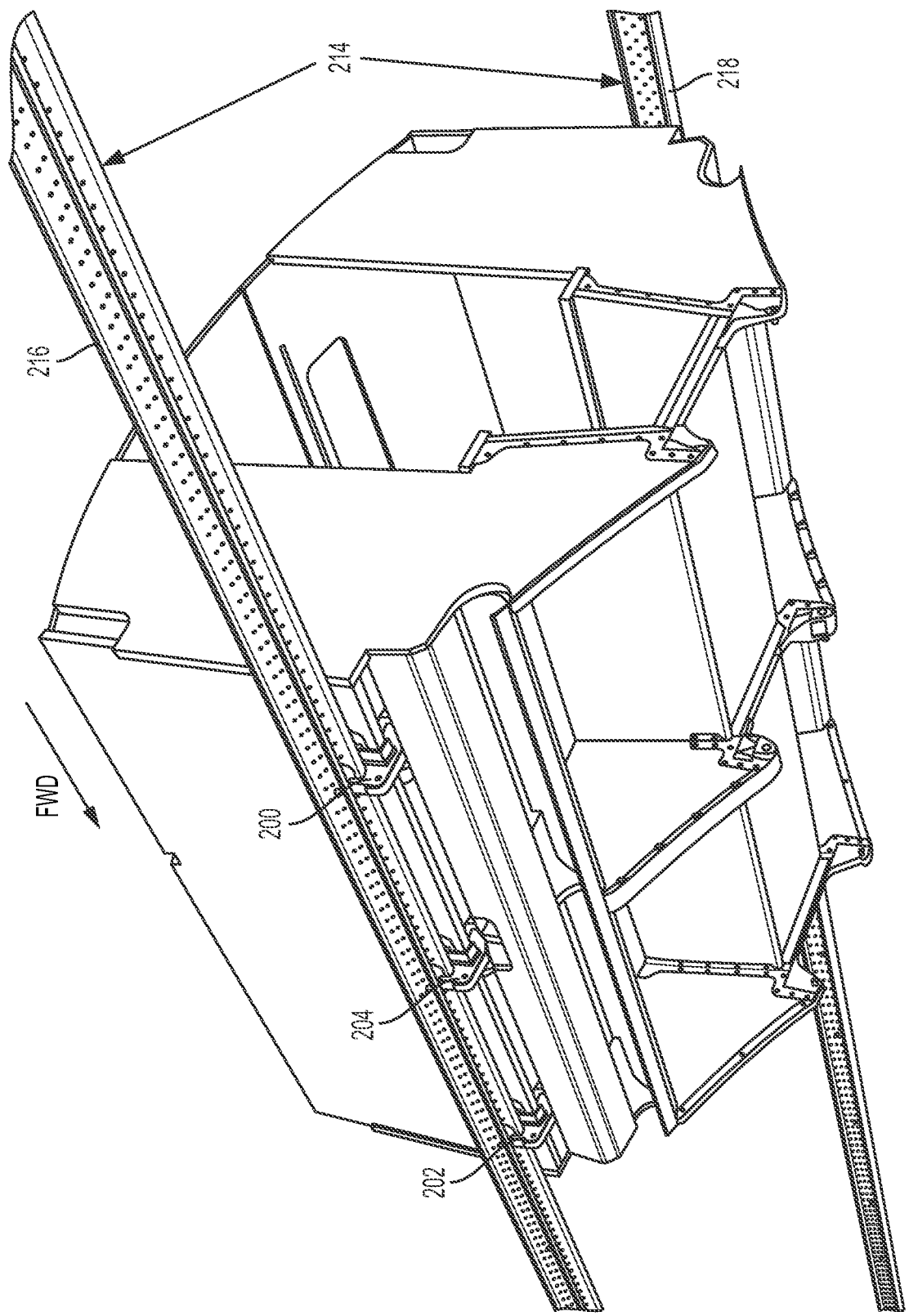
FIG. 15 is a perspective view of the overhead payload module attached to a support rail assembly, according to an example implementation.

FIG. 15 is a perspective view of the overhead payload module 104 attached to a support rail assembly 214, according to an example implementation. The support rail assembly includes a first support rail 216 and a second support rail 218. The first plurality of blade fittings 200, 202, 204 are attached to the first support rail 216. Although not shown in FIG. 15, the second plurality of blade fittings 208, 210, 212 are attached to the second support rail 218.

Figure 16:
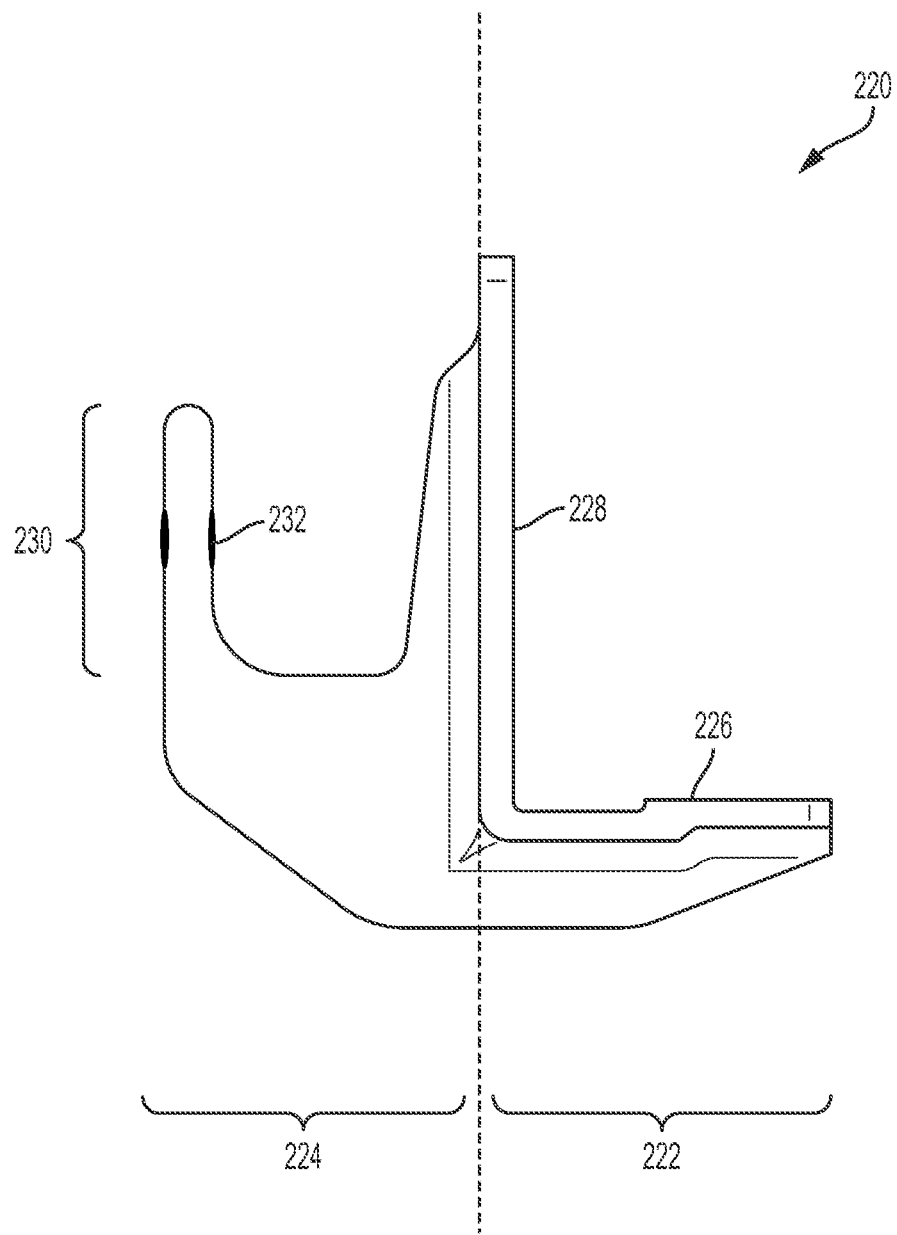
FIG. 16 is a side view of a blade fitting, according to an example implementation.

FIG. 16 is a side view of a blade fitting 220, according to an example implementation. The blade fitting 220 shown in FIG. 16 is a representative example of a form that one or more of the blade fittings described herein could take.

The blade fitting 220 includes a bracket portion 222 and a hook portion 224. The bracket portion 222 is configured as described above, with a first bracket arm 226 attachable to one of the floor panels and that, when attached, would extend towards a center longitudinal plane of the overhead payload module 104. The bracket portion also includes a second bracket arm 228 attachable to one of the back walls. The first bracket arm 226 and the second bracket arm 228 are shown to be substantially perpendicular with one another. Further, when attached, the second bracket arm 228 may be substantially parallel to a lateral axis of the overhead payload module 104.

The hook portion 224 protrudes from the second bracket arm 228. A distal end 230 of the hook portion 224 includes a bearing 232. As shown, the distal end 230 is substantially parallel to the second bracket arm 228. When the blade fitting 220 is attached to one of the support rails, at least a portion of the distal end 230 of the hook portion 224 can be inserted into an opening in the support rail. A fastener can then be inserted through a bore in one side of the support rail, through the bearing 232, and through a bore in another side of the support rail, before being secured in place. Within examples, a bolt and washer could be used to fasten the blade fitting 220 to the support rail. Other examples of fasteners are possible as well. In alternative implementations, other bracket portion and/or hook portion geometries are possible.

The design of the blade fitting 220 described above can improve the manner in which the overhead payload module 104 is installed in the aircraft 100. For instance, as will be described in greater detail below, the hook portion 224 of the blade fitting 220 can be lifted directly into an underside of a respective rail of the support rail assembly 214 and then secured.

FIG. 17 is a perspective view of the blade fitting 220 and a support rail 234, and another side view of the blade fitting 220, according to an example implementation. In particular, the perspective view of the blade fitting 220 depicts how the hook portion 224 of the blade fitting 220 would be secured to the support rail 234. And the side view of the blade fitting 220 depicts the blade fitting 220 when it is secured to the support rail 234. The support rail 234 shown in FIG. 17 could be a portion of either the first support rail 216 or the second support rail 218.

In addition, as shown, the first bracket arm 226 includes two protruding ears 236, 238 and the second bracket arm 228 includes four protruding ears 240, 242, 244, 246. Each such ear includes a bore configured for receiving a fastener. When attached to the overhead payload module 104, the fastener can be inserted through the bore. Other means for attaching the blade fitting 220 to the overhead payload module 104 are possible as well.

Further, as shown in the side view, the distal end of the blade fitting 220 has been inserted through an opening 248 in an underside of the support rail 234 and a fastener 250 has been used to attach the blade fitting 220 to the support rail 234.

Figure 18:
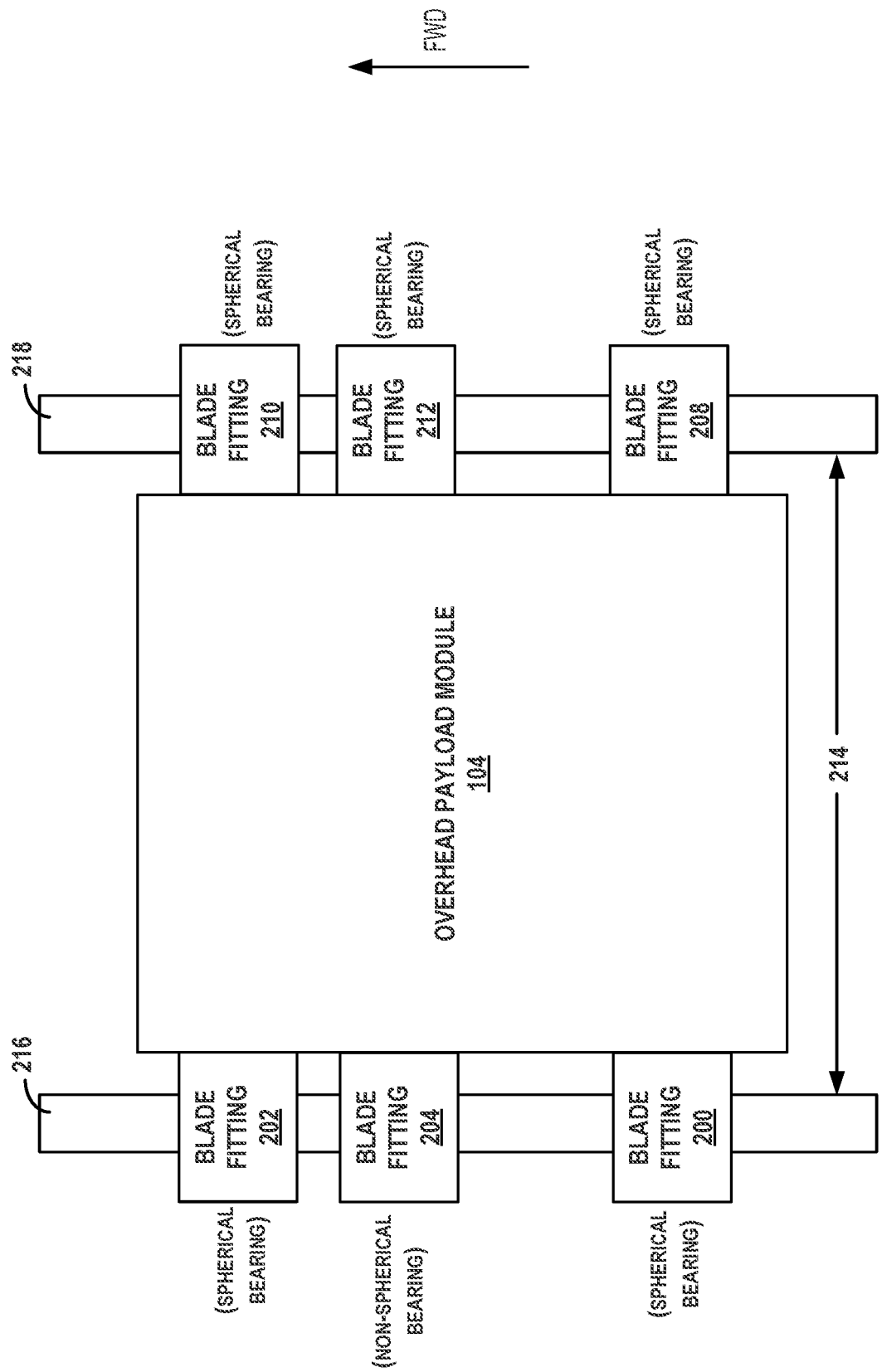
FIG. 18 depicts an arrangement of blade fittings of the overhead payload module used to attach the overhead payload module to the support rail assembly, according to an example implementation.

FIG. 18 depicts an arrangement of blade fittings of the overhead payload module 104 used to attach the overhead payload module 104 to the support rail assembly 214, according to an example implementation. Each blade fitting of the overhead payload module 104 could have any type of bearing, such as spherical bearing or a non-spherical, fixed bearing, by way of example. There may be certain advantages to which blade fittings do and do not have certain types of bearings, however. One such example is described with respect to FIG. 18, which shows various blade fittings relative to each other.

As shown in FIG. 18, the bearing of the first center blade fitting 204 is a non-spherical, fixed bearing, but the bearings of the second center blade fitting 212, the first pair of blade fittings 200, 202, and the second pair of blade fittings 208, 210, are all spherical bearings. As such, the overhead payload module 104 can be attached more rigidly to the second support rail 218, on the side of the second plurality of blade fittings 208, 210, 212, than to the first support rail 216. Phrased another way, one side (i.e., the side with the non-spherical, fixed bearing) has what may be referred to as a fixed bearing arrangement, and the other side (i.e., the side with all spherical bearings) has what may be referred to as a floating bearing arrangement. The "floating" side can thus have more freedom of movement to help compensate for excessive loads and potential misalignment (and also perhaps any potential thermal expansion or contraction). In addition, this can allow loads to be directed into the support rail assembly 214 in a tailored fashion. This can also help the combination of the overhead payload module 104 and the support rail assembly 214 to distribute loads. Other advantages are possible as well. Furthermore, in alternative implementations or in conjunction with examples discussed herein, one or more other blade fittings on the fixed bearing arrangement side could have non-spherical bearings as well. Other arrangements of spherical/non-spherical bearings are possible. For example, instead of a non-spherical, fixed bearing, a bushing could be employed. Additionally or alternatively, the second center blade fitting 212 could be the non-spherical, fixed bearing (or bushing).

Figure 19:
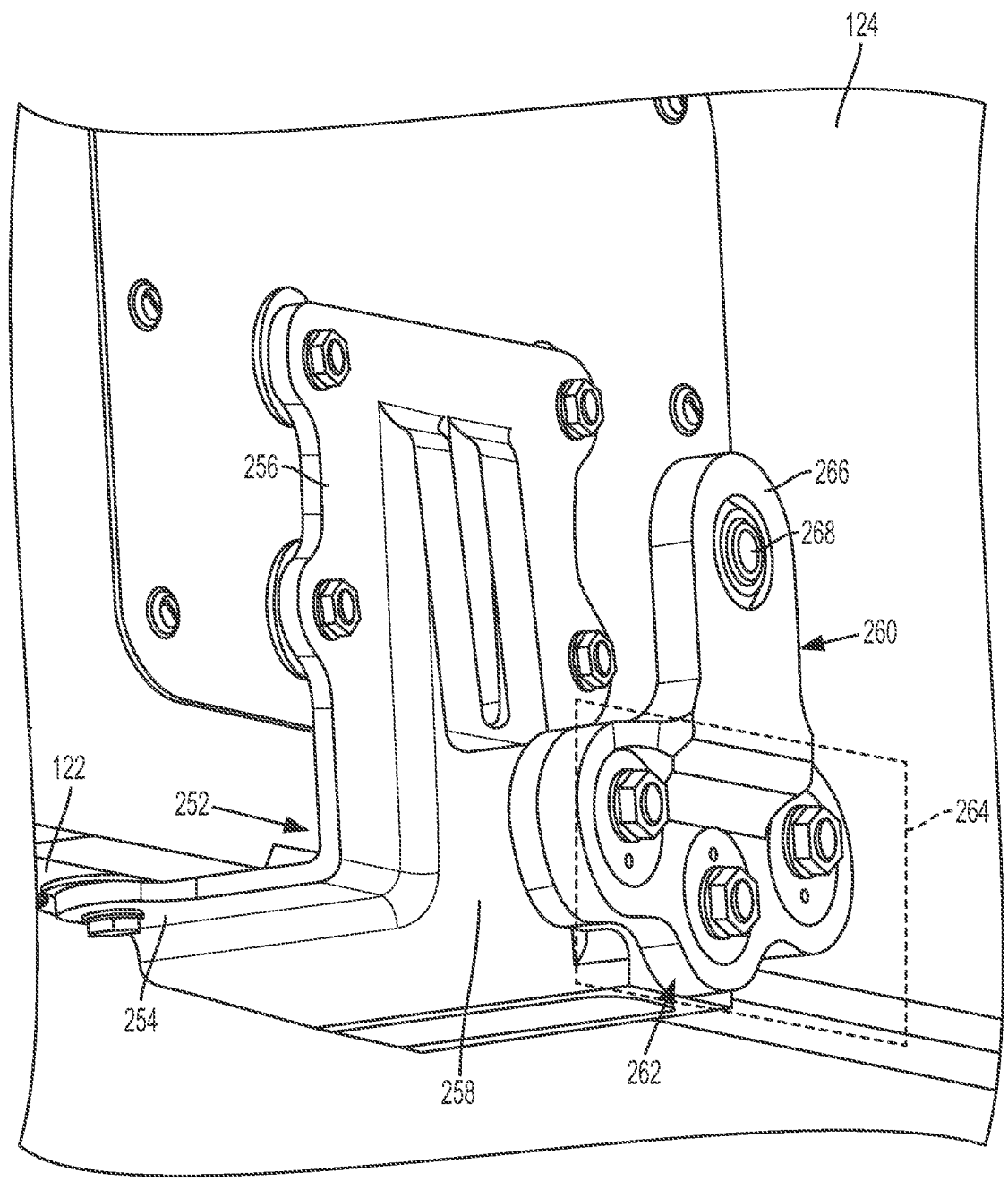
FIG. 19 is a perspective view of another type of blade fitting, according to an example implementation.

FIG. 19 is a perspective view of another type of blade fitting, according to an example implementation. Any one or more of the blade fittings described herein could take the form shown in FIG. 19. For purposes of example, however, FIG. 19 shows the blade fitting as being attached to the first payload module 114.

As shown, the blade fitting includes a bracket portion 252 (which includes bracket arms 254 and 256) attached to an exterior of one of the first or second payload modules. For purposes of example, FIG. 19 labels the payload module as the first payload module 114. Similar to blade fitting 220, the bracket portion 252 of the blade fitting in FIG. 19 includes (i) a first bracket arm 254 extending towards a center longitudinal plane of the overhead payload module 104 and attached to the first floor panel 122 and (ii) a second bracket arm 256 attached to the first back wall 124. Further, the blade fitting includes a connecting portion 258 that extends away from the center longitudinal plane of the overhead payload module 104, in a direction that is substantially opposite the direction that the first bracket arm 254 extends. A distal end of the connecting portion 258 can include a plurality of bores (not shown) that are configured to receive a plurality of fasteners.

In addition, the blade fitting includes a hook portion 260. The hook portion 260 includes a bushing end 262 that is adjustably attached to the connecting portion 258 via the plurality of fasteners. In particular, the bushing end includes a plurality of eccentric bushings configured to receive the plurality of fasteners (e.g., bolts). Each of the eccentric bushings can have its hole drilled off-center such that, as the bushing is rotated, the hole changes location in two directions.

The region in which the plurality of fasteners, the plurality of bores of the connecting portion 258, and the plurality of eccentric bushings are located is denoted as region 264. Although three of each are shown, in alternative implementations there could be more or less bores, fasteners, and bushings used to attach the hook portion 260 to the connecting portion 258. Lastly, the hook portion 260 includes a distal end 266, which includes a bearing 268. Similar to the other blade fittings described above, the distal end 266 can be configured to be inserted into openings of the support rail assembly 214 and attached via a fastener.

The hook portion 260, serving as a lug, is not part of the main portion (e.g., the bracket portion 252 and the connecting portion 258) of the blade fitting, and the plurality of eccentric bushings can be rotated to move the lug around. As so configured, more adjustability built into the blade fitting. More particularly, the eccentric bushings can serve as a tolerance backup in scenarios where there could be potential misalignment of the bearing 268 with the holes in the support rail to which the blade fitting of FIG. 19 is being secured. For example, if the bearing 268 does not line up with the holes in the support rail, the movement provided by the eccentric bushings can allow the hook portion 260, and thus the bearing 268, to be brought into alignment with the holes.

Figure 20:
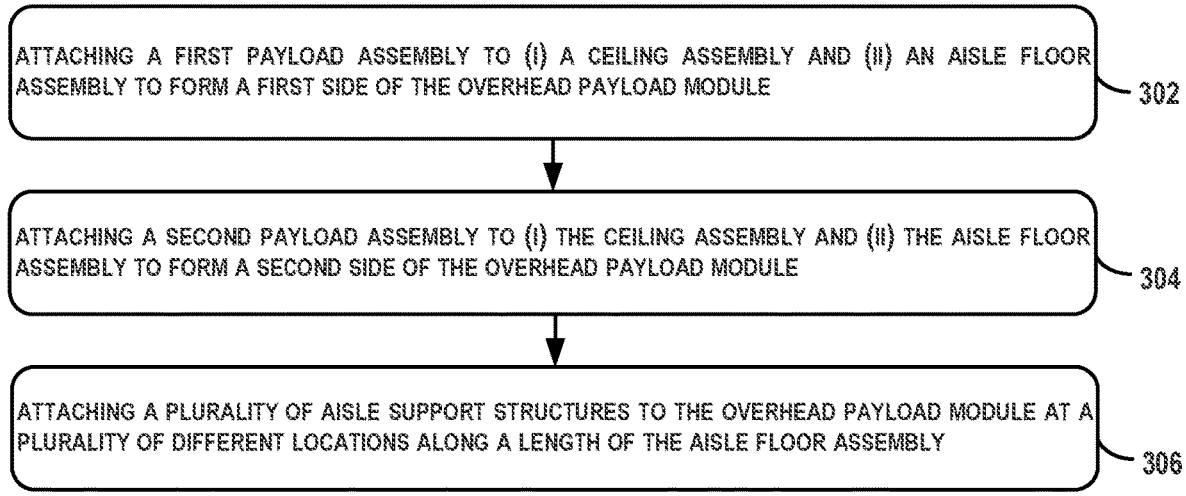
FIG. 20 shows a flowchart of an example method for balancing load in, and reinforcing an aisle structure of, the overhead payload module of the aircraft, according to an example implementation.

Various methods will now be described. First, FIG. 20 shows a flowchart of an example method 300 for balancing load in, and reinforcing an aisle structure of, an overhead payload module of an aircraft, according to an example implementation. FIGS. 21-24 then include functions associated with method 300.

Figure 25:
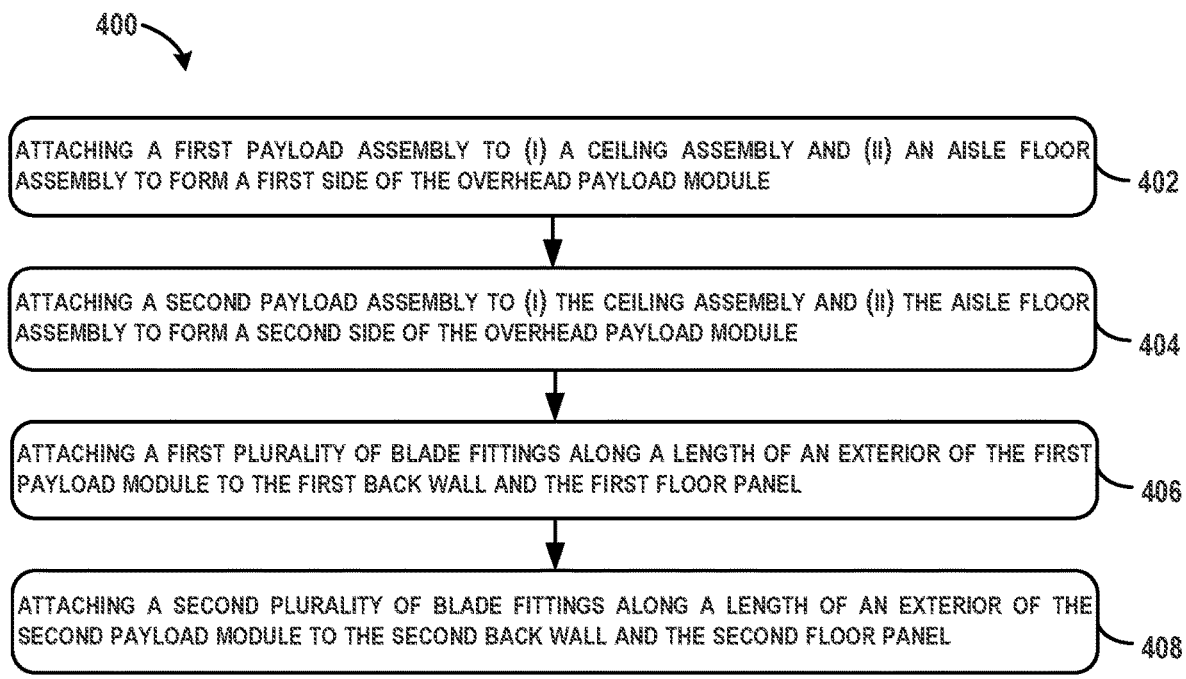
FIG. 25 shows a flowchart of an example method for assembling the overhead payload module of the aircraft, according to an example implementation.
Figure 26:
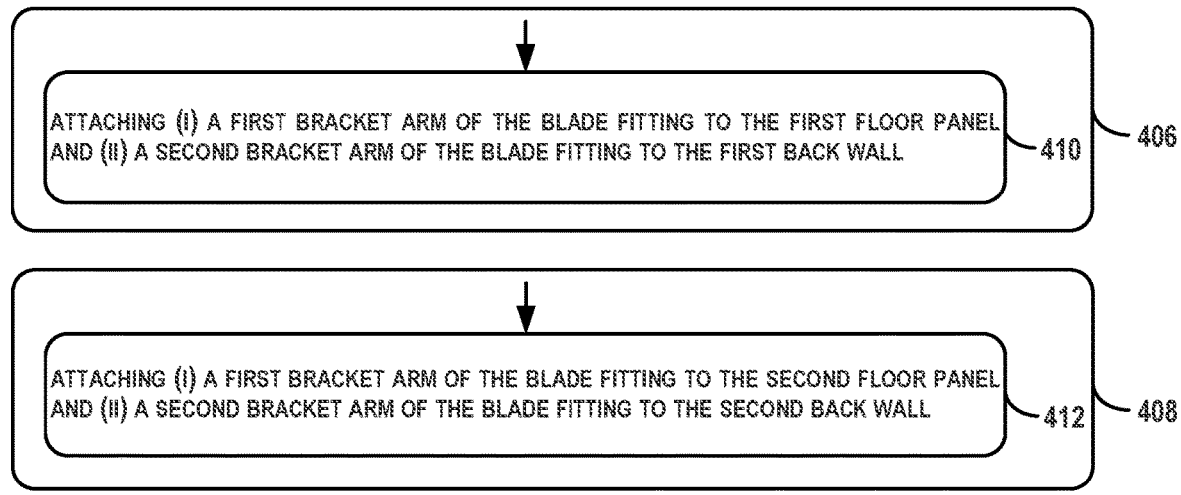
FIG. 26 shows a flowchart of an example method for performing two of the attaching functions of the method of FIG. 25, according to an example implementation.
Figure 27:
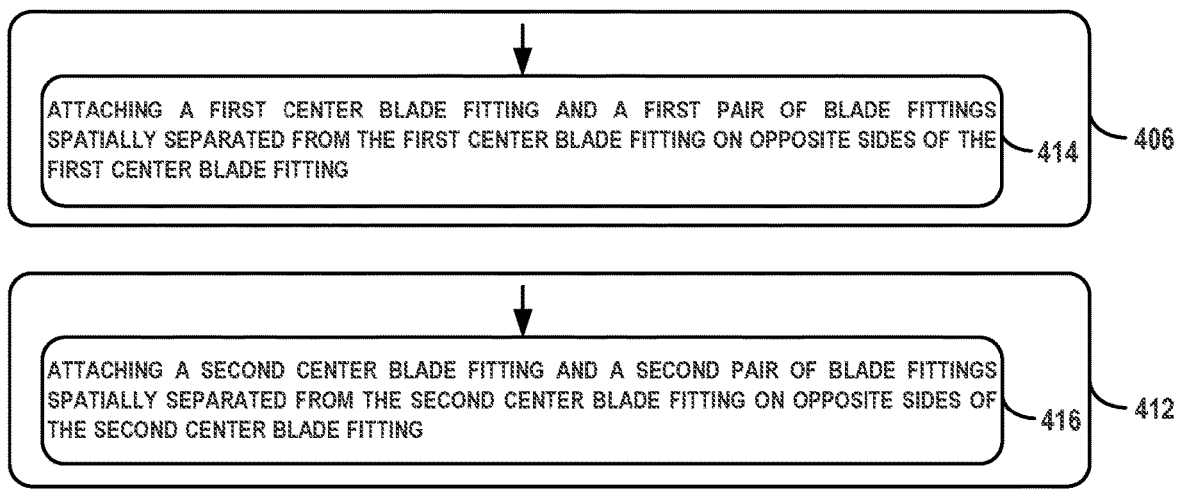
FIG. 27 shows a flowchart of another example method for performing two of the attaching functions of the method of FIG. 25, according to an example implementation.
Figure 28:
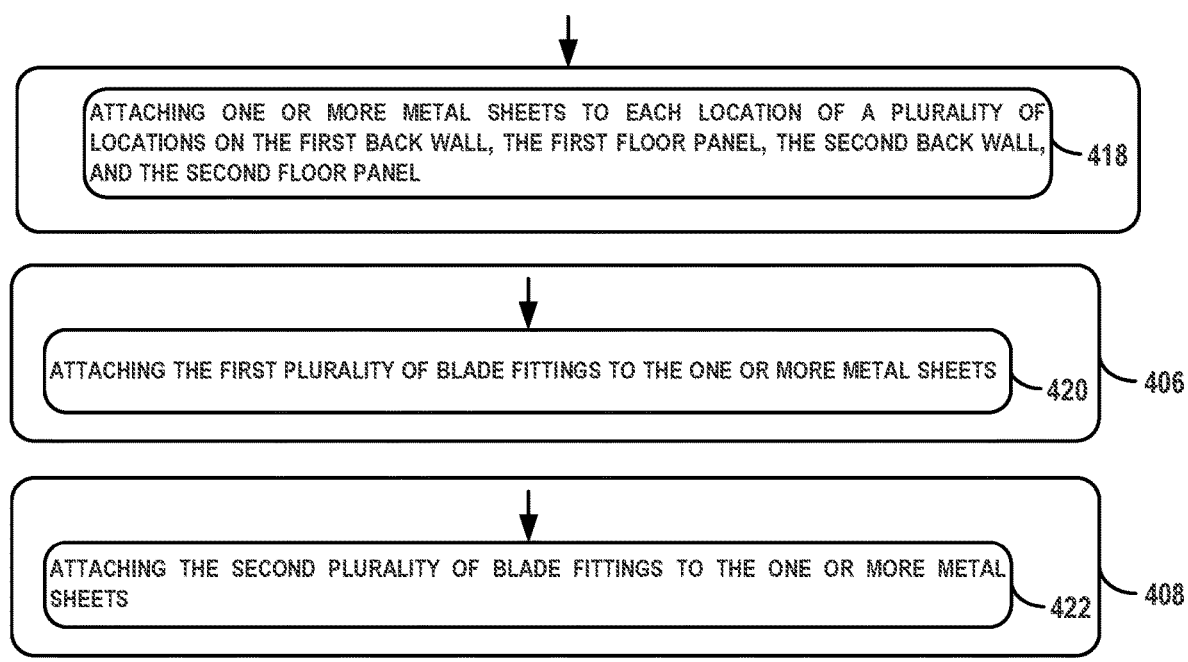
FIG. 28 shows a flowchart of an example method for use with the method of FIG. 25, as well as a flowchart of another example method for performing two of the attaching functions of the method of FIG. 25, according to an example implementation.

Next, FIG. 25 shows a flowchart of an example method 400 for assembling the overhead payload module of the aircraft, according to an example implementation. FIGS. 26-28 then include functions associated with method 400.

Figure 29:
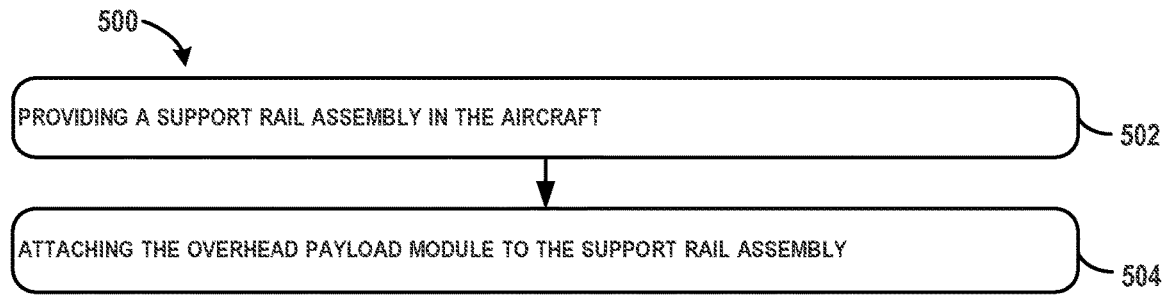
FIG. 29 shows a flowchart of an example method for installing the overhead payload module in the aircraft, according to an example implementation.
Figure 30:
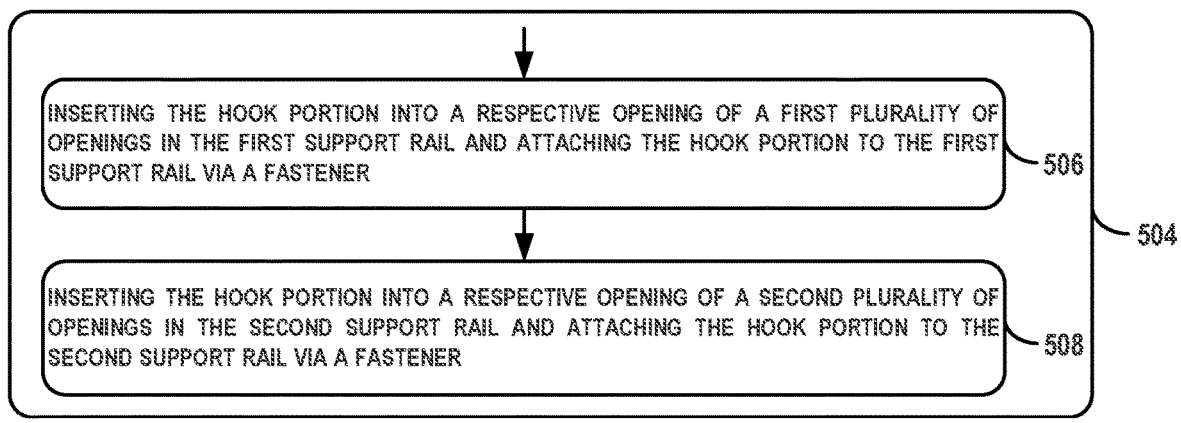
FIG. 30 shows a flowchart of an example method for performing the attaching function of the method of FIG. 29, according to an example implementation.
Figure 31:
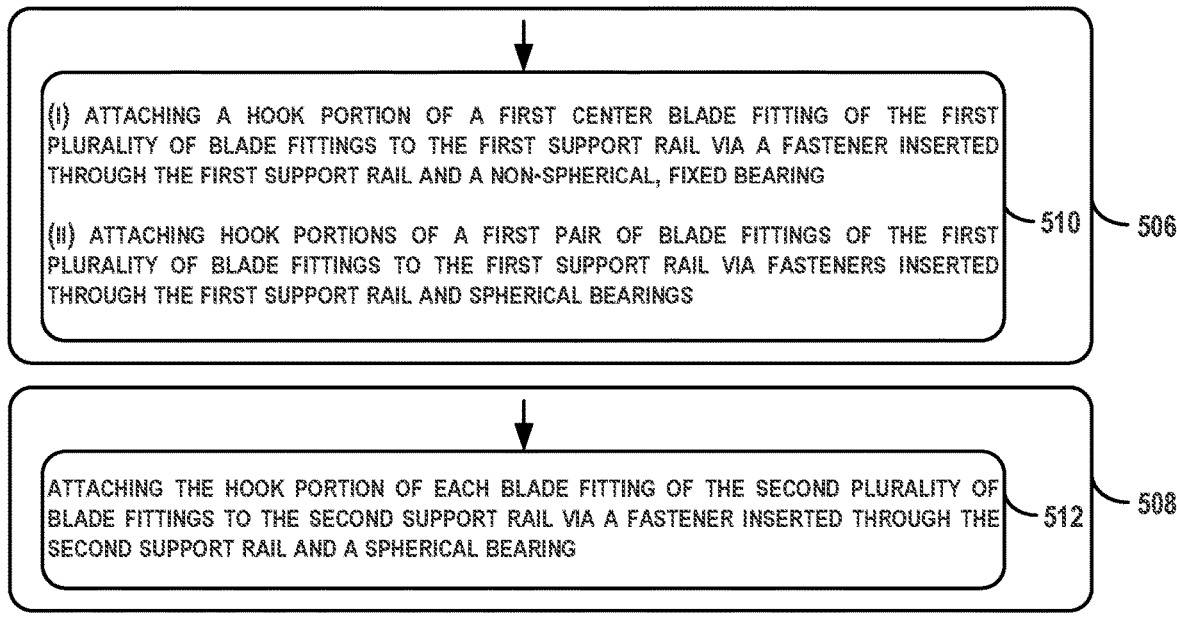
FIG. 31 shows a flowchart of an example method for performing the attaching functions of the method of FIG. 30, according to an example implementation.

Finally, FIG. 29 shows a flowchart of an example method 500 for installing the overhead payload module in the aircraft, according to an example implementation. FIGS. 30-31 then include functions associated with method 500.

Method 300, method 400, and method 500 present examples of methods that could be used with the aircraft 100 shown in FIG. 1 or with components of the aircraft 100 such as the overhead payload module 104 described above. Further, devices or systems, such as devices used for manufacturing aircrafts or components thereof, may be used or configured to perform functions presented in FIGS. 20, 25, and 29. In other examples, components of the devices and/or systems may be arranged to be adapted to, capable of, or suited for performing the functions, such as when operated in a specific manner.

Method 300 may include one or more operations, functions, or actions as illustrated by one or more of blocks 302-306. Method 400 may include one or more operations, functions, or actions as illustrated by one or more of blocks 402-408. And method 500 may include one or more operations, functions, or actions as illustrated by one or more of blocks 502-504. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Referring now to method 300 of FIG. 20, at block 302, the method 300 includes attaching a first payload assembly to (i) a ceiling assembly and (ii) an aisle floor assembly to form a first side of the overhead payload module. The first payload assembly can include a first payload module comprising a first floor panel. The first payload assembly can also include a first overhead stowbin module structurally integrated with the first payload module and having a first stowage area configured to receive stowbins and accessible via a main cabin area of the aircraft. The first overhead stowbin module can include a first pair of end walls attached to a first stowbin side wall. Further, the first pair of end walls, the first stowbin side wall, and the first floor panel can define the first stowage area.

At block 304, the method 300 includes attaching a second payload assembly to (i) the ceiling assembly and (ii) the aisle floor assembly to form a second side of the overhead payload module. The second payload assembly can be positioned opposite the first payload assembly to form an aisle therebetween. The second payload assembly can include a second payload module comprising a second floor panel. The second payload assembly can also include a second overhead stowbin module structurally integrated with the second payload module and having a second stowage area configured to receive stowbins and accessible via the main cabin area of the aircraft. The second overhead stowbin module can include a second pair of end walls attached to a second stowbin side wall. The second pair of end walls, the second stowbin side wall, and the second floor panel can define the second stowage area.

At block 306, the method 300 includes attaching a plurality of aisle support structures to the overhead payload module at a plurality of different locations along a length of the aisle floor assembly. Attaching the plurality of aisle support structures to the overhead payload module can involve, for each aisle support structure of the plurality of aisle support structures: attaching a first arm of a first support bracket to the first payload assembly and a second arm of the first support bracket to the aisle floor assembly, attaching a first arm of a second support bracket, positioned opposite the first support bracket, to the second payload assembly and a second arm of the second support bracket to the aisle floor assembly, and attaching a first end portion of a cross member between the aisle floor assembly and the first support bracket and a second end portion of the cross member between the aisle floor assembly and the second support bracket.

Figure 21:
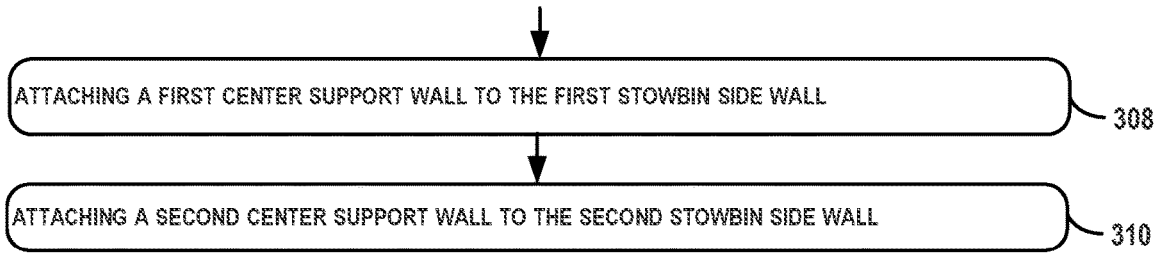
FIG. 21 shows a flowchart of an example method for use with the method of FIG. 20, according to an example implementation.

FIG. 21 shows a flowchart of an example method for use with the method 300, according to an example implementation. At block 308, functions include attaching a first center support wall to the first stowbin side wall. The first center support wall can be attached to the first stowbin side wall between the first pair of end walls to divide the first stowage area into two stowage areas each configured to receive stowbins, such that the first center support wall is substantially perpendicular to the first stowbin side wall and substantially parallel to the first pair of end walls. At block 310, functions include attaching a second center support wall to the second stowbin side wall. The second center support wall can be attached to the second stowbin side wall between the second pair of end walls to divide the second stowage area into two stowage areas each configured to receive stowbins, such that the second center support wall is substantially perpendicular to the second stowbin side wall and substantially parallel to the second pair of end walls.

Figure 22:
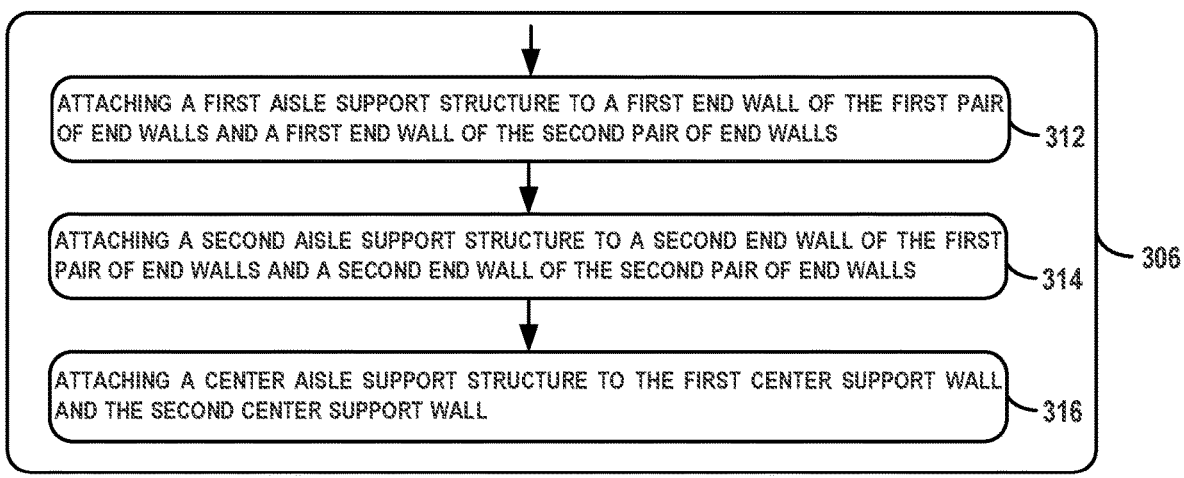
FIG. 22 shows a flowchart of an example method for performing one of the attaching functions of the method of FIG. 20, according to an example implementation.

FIG. 22 shows a flowchart of an example method for performing the attaching as shown in block 306, particularly in view of the attaching shown in blocks 308 and 310, according to an example implementation. At block 312, functions include attaching a first aisle support structure to a first end wall of the first pair of end walls and a first end wall of the second pair of end walls. At block 314, functions include attaching a second aisle support structure to a second end wall of the first pair of end walls and a second end wall of the second pair of end walls. At block 316, functions include attaching a center aisle support structure to the first center support wall and the second center support wall.

Figure 23:
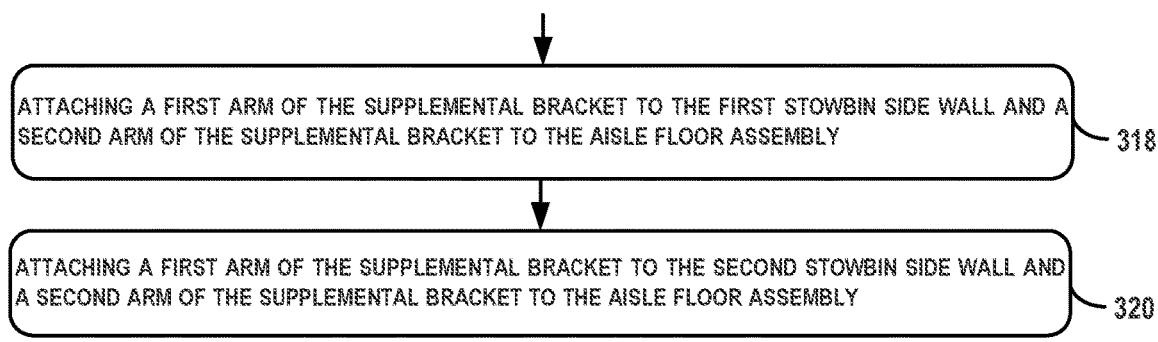
FIG. 23 shows a flowchart of another example method for use with the method of FIG. 20, according to an example implementation.

FIG. 23 shows a flowchart of another example method for use with the method 300, according to an example implementation. At block 318, functions relate to a method for attaching each supplemental bracket of a first plurality of supplemental brackets. In particular, at block 318, functions include attaching a first arm of the supplemental bracket to the first stowbin side wall and a second arm of the supplemental bracket to the aisle floor assembly. At block 320, functions relate to a method for attaching each supplemental bracket of a second plurality of supplemental brackets. In particular, at block 320, functions include attaching a first arm of the supplemental bracket to the second stowbin side wall and a second arm of the supplemental bracket to the aisle floor assembly.

Figure 24:
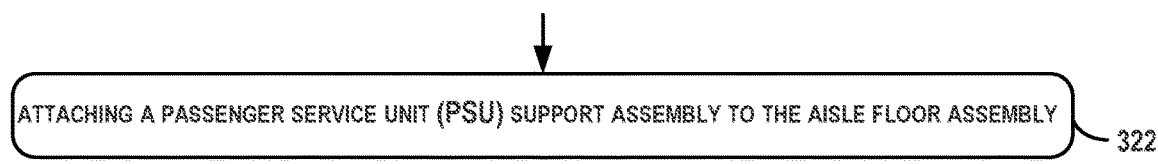
FIG. 24 shows a flowchart of another example method for use with the method of FIG. 20, according to an example implementation.

FIG. 24 shows a flowchart of another example method for use with the method 300, according to an example implementation. At block 322, functions include attaching a passenger service unit (PSU) support assembly to the aisle floor assembly. The PSU support assembly can include two side structures and an intermediate structure connecting the two side structures. The two side structures and the intermediate structure can define a trough-shaped space configured to receive a PSU. A distal end of one side structure of the two side structures can be configured to couple to a hinge of the PSU and enable the PSU to rotate about the hinge. A distal end of another side structure of the two side structures can be configured to receive latches of the PSU for securing the PSU to the PSU support assembly.

Referring now to method 400 of FIG. 25, at block 402, the method 400 includes attaching a first payload assembly to (i) a ceiling assembly and (ii) an aisle floor assembly to form a first side of the overhead payload module. The first payload assembly can include a first payload module comprising a first floor panel and a first back wall. The first payload assembly can also include a first overhead stowbin module structurally integrated with the first payload module and having a first stowage area configured to receive stowbins and accessible via a main cabin area of the aircraft.

At block 404, the method 400 includes attaching a second payload assembly to (i) the ceiling assembly and (ii) the aisle floor assembly to form a second side of the overhead payload module. The second payload assembly can be positioned opposite the first payload assembly to form an aisle therebetween. The second payload assembly can include a second payload module comprising a second floor panel and a second back wall. The second payload assembly can also include a second overhead stowbin module structurally integrated with the second payload module and having a second stowage area configured to receive stowbins and accessible via the main cabin area of the aircraft.

At block 406, the method 400 includes attaching a first plurality of blade fittings along a length of an exterior of the first payload module to the first back wall and the first floor panel.

At block 408, the method 400 includes attaching a second plurality of blade fittings along a length of an exterior of the second payload module to the second back wall and the second floor panel. Each blade fitting of the first plurality of blade fittings and the second plurality of blade fittings is configured for attaching to a support rail assembly of the aircraft so as to attach the overhead payload module to the support rail assembly within the aircraft.

FIG. 26 shows a flowchart of an example method for performing the attaching as shown in block 406, according to an example implementation. At block 410, functions relate to a method for attaching each blade fitting of the first plurality of blade fittings. In particular, at block 410, functions include attaching (i) a first bracket arm of the blade fitting to the first floor panel and (ii) a second bracket arm of the blade fitting to the first back wall.

In addition, FIG. 26 shows a flowchart of another example method for performing the attaching as shown in block 408, according to an example implementation. At block 412, functions relate to a method for attaching each blade fitting of the second plurality of blade fittings. In particular, at block 412, functions include attaching (i) a first bracket arm of the blade fitting to the second floor panel and (ii) a second bracket arm of the blade fitting to the second back wall. A hook portion can protrude from the second bracket arm of each blade fitting of the first plurality of blade fittings and the second plurality of blade fittings, and a distal end of the hook portion can include a bearing and can be configured to be inserted into an opening of the support rail assembly and attached to the support rail assembly with a fastener inserted through the support rail assembly and the bearing.

FIG. 27 shows a flowchart of another example method for performing the attaching as shown in block 406, according to an example implementation. At block 414, functions include attaching a first center blade fitting and a first pair of blade fittings spatially separated from the first center blade fitting on opposite sides of the first center blade fitting.

In addition, FIG. 27 shows a flowchart of another example method for performing the attaching as shown in block 412, according to an example implementation. At block 416, functions include attaching a second center blade fitting and a second pair of blade fittings spatially separated from the second center blade fitting on opposite sides of the second center blade fitting. The bearing of the first center blade fitting can be a non-spherical, fixed bearing, and the bearing of the second center blade fitting, the first pair of blade fittings, and the second pair of blade fittings can be a spherical bearing.

In some implementations, some functions may be performed before the functions at blocks 406 and 408 are performed. FIG. 28 shows a flowchart of an example method for use with the method of FIG. 25, according to an example implementation. In particular, before attaching the first plurality of blade fittings along the length of the exterior of the first payload module to the first back wall and the first floor panel and attaching the second plurality of blade fittings along the length of the exterior of the second payload module to the second back wall and the second floor panel, functions include attaching one or more metal sheets to each location of a plurality of locations on the first back wall, the first floor panel, the second back wall, and the second floor panel, as shown in block 418.

In addition, FIG. 28 shows a flowchart of another example method for performing the attaching as shown in block 406, according to an example implementation. At block 420, functions include attaching the first plurality of blade fittings to the one or more metal sheets.

Further, FIG. 28 shows a flowchart of another example method for performing the attaching as shown in block 408, according to an example implementation. At block 422, functions include attaching the second plurality of blade fittings to the one or more metal sheets.

Referring now to method 500 of FIG. 29, at block 502, the method 500 includes providing a support rail assembly in the aircraft. The support rail assembly can include a first support rail positioned on a first side of the aircraft and a second support rail positioned on a second side of the aircraft opposite the first side. The first support rail and the second support rail can be substantially parallel and substantially planar.

At block 504, the method 500 includes attaching the overhead payload module to the support rail assembly. The overhead payload module can be attached to the support rail assembly to position the overhead payload module above a main cabin area of the aircraft and between the first support rail and the second support rail. The overhead payload module can include a first payload assembly and a second payload assembly. The first payload assembly can include a first payload module, a first overhead stowbin module structurally integrated with the first payload module and having a first stowage area, and a first plurality of blade fittings attached along a length of an exterior of the first payload module. Each blade fitting of the first plurality of blade fittings can include bracket portion attached to a first back wall and a first floor panel of the first payload module and a hook portion protruding from the bracket portion and attachable to the first support rail. The second payload assembly can include a second payload module, a second overhead stowbin module structurally integrated with the second payload module and having a second stowage area, and a second plurality of blade fittings attached along a length of an exterior of the second payload module. Each blade fitting of the second plurality of blade fittings can include bracket portion attached to a second back wall and a second floor panel of the second payload module and a hook portion protruding from the bracket portion and attachable to the second support rail. Attaching the overhead payload module to the support rail assembly to position the overhead payload module above the main cabin area of the aircraft and between the first support rail and the second support rail can involve attaching the hook portion of each blade fitting of the first plurality of blade fittings to the first support rail and attaching the hook portion of each blade fitting of the second plurality of blade fittings to the second support rail.

FIG. 30 shows a flowchart of an example method for performing the attaching as shown in block 504, according to an example implementation. In particular, FIG. 29 shows a flowchart of an example method for attaching the hook portion of each blade fitting of the first plurality of blade fittings to the first support rail, as well as an example method for attaching the hook portion of each blade fitting of the second plurality of blade fittings to the second support rail. In either case, for each blade fitting of the first and second plurality of blade fittings, a respective hook portion is inserted into a respective opening in a respective support rail. For each blade fitting of the first plurality of blade fittings, for instance, a respective hook portion is inserted into a respective opening of a first plurality of openings in the first support rail. And for each blade fitting of the second plurality of blade fittings, a respective hook portion is inserted into a respective opening of a second plurality of openings in the second support rail.

For the first plurality of blade fittings, for instance, at block 506, functions include inserting the hook portion into a respective opening of a first plurality of openings in the first support rail and attaching the hook portion to the first support rail via a fastener. The fastener can be inserted through the first support rail and a bearing at a distal end of the hook portion. For the second plurality of blade fittings, at block 508, functions include inserting the hook portion into a respective opening of a second plurality of openings in the second support rail and attaching the hook portion to the second support rail via a fastener. The fastener can be inserted through the second support rail and a bearing at a distal end of the hook portion.

FIG. 31 shows a flowchart of an example method for performing the attaching as shown in block 506, according to an example implementation. In particular, FIG. 31 shows a flowchart of an example method for attaching the hook portion of each blade fitting of the first plurality of blade fittings to the first support rail. At block 510, functions include (i) attaching a hook portion of a first center blade fitting of the first plurality of blade fittings to the first support rail via a fastener inserted through the first support rail and a non-spherical, fixed bearing and (ii) attaching hook portions of a first pair of blade fittings of the first plurality of blade fittings to the first support rail via fasteners inserted through the first support rail and spherical bearings. The non-spherical, fixed bearing can be at a distal end of the hook portion of the first center blade fitting. The spherical bearings can be at distal ends of the hook portions of the first pair of blade fittings. The first pair of blade fittings can be spatially separated from the first center blade fitting on opposite sides of the first center blade fitting.

FIG. 31 also shows a flowchart of an example method for performing the attaching as shown in block 508, according to an example implementation. In particular, FIG. 31 shows a flowchart of an example method for attaching the hook portion of each blade fitting of the second plurality of blade fittings to the second support rail. At block 512, functions include attaching the hook portion of each blade fitting of the second plurality of blade fittings to the second support rail via a fastener inserted through the second support rail and a spherical bearing. The spherical bearing can be at the distal end of the hook portion.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. An overhead payload module for installation in an aircraft, the overhead payload module comprising:
    an aisle floor assembly;
    a first payload assembly attached to the aisle floor assembly to form a first side of the overhead payload module, wherein the first payload assembly comprises:
        a first payload module,
        at least one first blade fitting attached to an exterior of the first payload module, and
        a first overhead stowbin module structurally integrated with the first payload module and having a first stowage area configured to receive stowbins; and
    a second payload assembly attached to the aisle floor assembly to form a second side of the overhead payload module, wherein the second payload assembly is positioned opposite the first payload assembly to form an aisle therebetween, wherein the second payload assembly comprises:
        a second payload module,
        at least one second blade fitting attached to an exterior of the second payload module, and
        a second overhead stowbin module structurally integrated with the second payload module and having a second stowage area configured to receive stowbins,
    wherein the at least one first blade fitting and the at least one second blade fitting are configured for attaching to a support rail assembly of the aircraft so as to attach the overhead payload module to the support rail assembly within the aircraft.

2. The overhead payload module of claim 1, wherein each blade fitting of the at least one first blade fitting and the at least one second blade fitting comprises:
    a bracket portion attached to an exterior of one of the first payload module and the second payload module, and
    a hook portion protruding from the bracket portion, wherein a distal end of the hook portion includes a bearing and is configured to be inserted into an opening of the support rail assembly and attached to the support rail assembly with a fastener inserted through the support rail assembly and the bearing.

3. The overhead payload module of claim 2, wherein the at least one first blade fitting comprises three blade fittings including a first center blade fitting and a first pair of blade fittings spatially separated from the first center blade fitting on opposite sides of the first center blade fitting,
    wherein the at least one second blade fitting comprises three blade fittings including a second center blade fitting and a second pair of blade fittings spatially separated from the second center blade fitting on opposite sides of the second center blade fitting, and
    wherein the bearing of the first center blade fitting is a first type of bearing, and wherein the bearing of the second center blade fitting, the first pair of blade fittings, and the second pair of blade fittings is a second type of bearing, different from the first type of bearing.

4. The overhead payload module of claim 2, wherein the distal end of the hook portion is substantially parallel to a lateral axis of the overhead payload module.

5. The overhead payload module of claim 2, wherein the bracket portion includes a plurality of protruding ears, and
    wherein each protruding ear of the plurality of protruding ears includes a bore configured for receiving a fastener when the blade fitting is attached to the overhead payload module.

6. The overhead payload module of claim 1, wherein each blade fitting of the at least one first blade fitting and the at least one second blade fitting comprises:
    a bracket portion attached to an exterior of one of the first payload module and the second payload module,
    a connecting portion protruding from the bracket portion and having at least one bore configured to receive at least one fastener, and
    a hook portion comprising (i) a bushing end attached to the connecting portion via the at least one fastener, wherein the bushing end includes at least one bushing configured to receive the at least one fastener and (ii) a distal end including a bearing, wherein the distal end is configured to be inserted into an opening of the support rail assembly and attached to the support rail assembly with a fastener inserted through the support rail assembly and the bearing.

7. The overhead payload module of claim 1, further comprising one or more metal sheets attached between each blade fitting of the at least one first blade fitting and the at least one second blade fitting and the overhead payload module.

8. The overhead payload module of claim 1, wherein the at least one first blade fitting is substantially aligned with the at least one second blade fitting.

9. An aircraft comprising:
a fuselage;
an overhead payload module comprising:
an aisle floor assembly positioned above a main cabin area of the aircraft,
a first payload assembly attached to the aisle floor assembly to form a first side of the overhead payload module, wherein the first payload assembly comprises:
a first payload module,
at least one first blade fitting attached to an exterior of the first payload module, and
a first overhead stowbin module structurally integrated with the first payload module and having a first stowage area configured to receive stowbins, and
a second payload assembly attached to the aisle floor assembly to form a second side of the overhead payload module, wherein the second payload assembly is positioned opposite the first payload assembly to form an aisle therebetween, wherein the second payload assembly comprises:
a second payload module,
at least one second blade fitting attached to an exterior of the second payload module, and
a second overhead stowbin module structurally integrated with the second payload module and having a second stowage area configured to receive stowbins; and
a support rail assembly positioned within the fuselage and configured to support the overhead payload module, wherein the at least one first blade fitting and the at least one second blade fitting are configured for attaching to the support rail assembly so as to attach the overhead payload module to the support rail assembly within the aircraft.

10. The aircraft of claim 9, wherein each blade fitting of the at least one first blade fitting and the at least one second blade fitting comprises:
a bracket portion attached to an exterior of one of the first payload module and the second payload module, and
a hook portion protruding from the bracket portion, wherein a distal end of the hook portion includes a bearing and is configured to be inserted into an opening of the support rail assembly and attached to the support rail assembly with a fastener inserted through the support rail assembly and the bearing.

11. The aircraft of claim 10, wherein the at least one first blade fitting comprises three blade fittings including a first center blade fitting and a first pair of blade fittings spatially separated from the first center blade fitting on opposite sides of the first center blade fitting,
wherein the at least one second blade fitting comprises three blade fittings including a second center blade fitting and a second pair of blade fittings spatially separated from the second center blade fitting on opposite sides of the second center blade fitting, and
wherein the bearing of the first center blade fitting is a first type of bearing, and wherein the bearing of the second center blade fitting, the first pair of blade fittings, and the second pair of blade fittings is a second type of bearing, different from the first type of bearing.

12. The aircraft of claim 10, wherein the distal end of the hook portion is substantially parallel to a lateral axis of the overhead payload module.

13. The aircraft of claim 10, wherein the bracket portion includes a plurality of protruding ears, and
wherein each protruding ear of the plurality of protruding ears includes a bore configured for receiving a fastener when the blade fitting is attached to the overhead payload module.

14. The aircraft of claim 9, further comprising one or more metal sheets attached between each blade fitting of the at least one first blade fitting and the at least one second blade fitting and the overhead payload module.

15. A method for assembling an overhead payload module of an aircraft, the method comprising:
attaching a first payload assembly to an aisle floor assembly to form a first side of the overhead payload module, wherein the first payload assembly comprises:
a first payload module, and
a first overhead stowbin module structurally integrated with the first payload module and having a first stowage area configured to receive stowbins;
attaching a second payload assembly to the aisle floor assembly to form a second side of the overhead payload module, wherein the second payload assembly is positioned opposite the first payload assembly to form an aisle therebetween, wherein the second payload assembly comprises:
a second payload module, and
a second overhead stowbin module structurally integrated with the second payload module and having a second stowage area configured to receive stowbins;
attaching at least one first blade fitting to an exterior of the first payload module; and
attaching at least one second blade fitting to an exterior of the second payload module,
wherein the at least one first blade fitting and the at least one second blade fitting are configured for attaching to a support rail assembly of the aircraft so as to attach the overhead payload module to the support rail assembly within the aircraft.

16. The method of claim 15, wherein attaching the at least one first blade fitting to the exterior of the first payload module comprises attaching, to the exterior of the first payload module, at least one first blade fitting having a bracket portion and a hook portion protruding from the bracket portion, wherein attaching the at least one second blade fitting to the exterior of the second payload module comprises attaching, to the exterior of the second payload module, at least one second blade fitting having the bracket portion and the hook portion protruding from the bracket portion, and
wherein a distal end of the hook portion includes a bearing and is configured to be inserted into an opening of the support rail assembly and attached to the support rail assembly with a fastener inserted through the support rail assembly and the bearing.

17. The method of claim 16, wherein attaching the at least one first blade fitting to the exterior of the first payload module comprises attaching a first center blade fitting and a first pair of blade fittings spatially separated from the first center blade fitting on opposite sides of the first center blade fitting,
wherein attaching the at least one second blade fitting to the exterior of the second payload module comprises attaching a second center blade fitting and a second pair of blade fittings spatially separated from the second center blade fitting on opposite sides of the second center blade fitting, and wherein the bearing of the first center blade fitting is a first type of bearing, and wherein the bearing of the second center blade fitting, the first pair of blade fittings, and the second pair of blade fittings is a second type of bearing, different from the first type of bearing.

18. The method of claim 15, further comprising:

before attaching the at least one first blade fitting to the exterior of the first payload module and attaching the at least one second blade fitting to the exterior of the second payload module, attaching, to each location of at least one location on the first payload module, one or more metal sheets, wherein attaching the at least one first blade fitting to the exterior of the first payload module comprises attaching the at least one first blade fitting to the one or more metal sheets, and wherein attaching the at least one second blade fitting to the exterior of the second payload module comprises attaching the at least one second blade fitting to the one or more metal sheets.

19. A method for installing an overhead payload module in an aircraft, the method comprising:

providing a support rail assembly in the aircraft, wherein the support rail assembly comprises a first support rail positioned on a first side of the aircraft and a second support rail positioned on a second side of the aircraft opposite the first side; and attaching the overhead payload module to the support rail assembly to position the overhead payload module between the first support rail and the second support rail, wherein the overhead payload module comprises a first payload assembly and a second payload assembly, wherein the first payload assembly comprises a first payload module, a first overhead stowbin module structurally integrated with the first payload module and having a first stowage area, and at least one first blade fitting attached to an exterior of the first payload module, wherein each blade fitting of the at least one first blade fitting comprises a bracket portion attached to the exterior of the first payload module and a hook portion protruding from the bracket portion and attachable to the first support rail, wherein the second payload assembly comprises a second payload module, a second overhead stowbin module structurally integrated with the second payload module and having a second stowage area, and at least one second blade fitting attached to an exterior of the second payload module, wherein each blade fitting of the at least one second blade fitting comprises a bracket portion attached to the exterior of the second payload module and a hook portion protruding from the bracket portion and attachable to the second support rail, and wherein attaching the overhead payload module to the support rail assembly to position the overhead payload module between the first support rail and the second support rail comprises attaching the hook portion of each blade fitting of the at least one first blade fitting to the first support rail and attaching the hook portion of each blade fitting of the at least one second blade fitting to the second support rail.

20. The method of claim 19, wherein attaching the hook portion of each blade fitting of the at least one first blade fitting to the first support rail comprises inserting the hook portion of each blade fitting of the at least one first blade fitting into a respective opening of at least one first opening in the first support rail and attaching the hook portion of each blade fitting of the at least one first blade fitting to the first support rail via a fastener inserted through the first support rail and a bearing at a distal end of the hook portion, and wherein attaching the hook portion of each blade fitting of the at least one second blade fitting to the second support rail comprises inserting the hook portion of each blade fitting of the at least one second blade fitting into a respective opening of at least one second opening in the second support rail and attaching the hook portion of each blade fitting of the at least one second blade fitting to the second support rail via a fastener inserted through the second support rail and a bearing at a distal end of the hook portion.

* * * * *